US007175676B1

(12) United States Patent
Stevens et al.

(10) Patent No.: US 7,175,676 B1
(45) Date of Patent: Feb. 13, 2007

(54) PROCESS FOR MANUFACTURING HIGH-STABILITY CRYSTALLINE ANODIC ALUMINUM OXIDE FOR PULSE DISCHARGE CAPACITORS

(75) Inventors: James L. Stevens, Irmo, SC (US); A. Corina Geiculescu, Easley, SC (US); Thomas F. Strange, Easley, SC (US)

(73) Assignee: Pacesetter, Inc., Sunnyvale, CA (US)

( * ) Notice: Subject to any disclaimer, the term of this patent is extended or adjusted under 35 U.S.C. 154(b) by 46 days.

(21) Appl. No.: 10/813,200

(22) Filed: Mar. 29, 2004

(51) Int. Cl.
  *H01G 9/00* (2006.01)
(52) U.S. Cl. .................... 29/25.03; 29/25.01; 361/523; 361/525; 361/527; 361/528; 361/508
(58) Field of Classification Search ............... 361/527, 361/523–525, 528–534, 502; 29/25.03, 25.01
  See application file for complete search history.

(56) References Cited

U.S. PATENT DOCUMENTS

| | | | |
|---|---|---|---|
| 4,518,471 A | 5/1985 | Arora ..................... 204/129.1 |
| 4,525,249 A | 6/1985 | Arora ..................... 204/129.75 |
| 5,124,022 A * | 6/1992 | Evans et al. ................. 205/175 |
| 5,131,388 A | 7/1992 | Pless et al. ............. 128/419 D |
| 5,449,448 A | 9/1995 | Kurihara et al. ............ 205/153 |
| 5,715,133 A | 2/1998 | Harrington et al. ......... 361/500 |
| 6,197,184 B1 * | 3/2001 | Hemphill et al. ........... 205/333 |
| 6,409,905 B1 * | 6/2002 | Melody et al. ............. 205/234 |
| 6,459,565 B1 * | 10/2002 | Lessner et al. ............. 361/508 |
| 6,611,422 B2 * | 8/2003 | Yamazaki et al. .......... 361/508 |
| 6,804,109 B1 * | 10/2004 | Hahn et al. ................. 361/524 |
| 7,125,610 B2 * | 10/2006 | Kinard et al. ............ 428/472.2 |

* cited by examiner

*Primary Examiner*—Nguyen T. Ha
(74) *Attorney, Agent, or Firm*—Steven M. Mitchell

(57) ABSTRACT

A process for producing high stability crystalline anodic aluminum oxide includes anodizing an anodic foil, hydrating the foil, and forming a barrier oxide layer on the foil. Anodizing the anodic foil produces nano-porous amorphous oxides which can then be converted to a crystalline precursor material by hydrating the foil. Next, an oxide layer formation step is utilized to form a barrier oxide layer on the surface of the anodized and hydrated foil. The resulting anodic oxides have very low levels of defects, voids and tensile stresses and have rise times as low as about 1 second to about 3 seconds after exposure of the formed samples to boiling water for 2 hours.

50 Claims, 10 Drawing Sheets

PROCESS FOR MANUFACTURING HIGH-STABILITY CRYSTALLINE ANODIC ALUMINUM OXIDE FOR PULSE DISCHARGE CAPACITORS

BACKGROUND OF THE INVENTION

1. Field of the Invention

This invention relates generally to a process for producing anodic foils having high stability crystalline anodic aluminum oxide for use in pulse discharge capacitors. This invention also relates to a fast-charging, low leakage current anodic foil produced by the process of the invention, an electrolytic capacitor incorporating this anodic foil, and an implantable cardioverter defibrillator (ICD) incorporating an electrolytic capacitor having this anodic foil.

2. Related Art

Compact, high voltage capacitors are utilized as energy storage reservoirs in many applications, including implantable medical devices. These capacitors are required to have a high energy density since it is desirable to minimize the overall size of the implanted device. This is particularly true of an Implantable Cardioverter Defibrillator (ICD), also referred to as an implantable defibrillator, since the high voltage capacitors used to deliver the defibrillation pulse can occupy as much as one third of the ICD volume.

An ICD system normally includes control electronics, a high current electrical battery cell, an energy storage reservoir (i.e., charge capacitor(s)), and a step-up transformer and power conversion circuitry to charge the capacitor(s). Typically, the ICD charges the storage capacitor(s) to a high voltage (700–800 Volts)

Electrolytic capacitors are used in ICDs because they have the most nearly ideal properties in terms of size, reliability and ability to withstand relatively high voltage. Typically, these capacitors can be aluminum electrolytic capacitors (either rolled or flat).

Aluminum electrolytic capacitors having aluminum foil plates rolled into a very small volume are generally used in ICDs. However, flat, layered capacitors have recently been developed for use in ICDs. By etching the surface of the aluminum anode foil, the surface area can be further increased such that the capacitance increases accordingly.

Since these capacitors must typically store approximately 30–40 joules, their size can be relatively large, and it is difficult to package them in a small implantable device. Some patients who have a device implanted may be bothered by the presence of the large object in their pectoral region. Furthermore, the generally rectangular shape of some prior art devices can in some instances lead to pocket erosion at the somewhat curved corners of the device. For the comfort of the patient, it is desirable to be able to make smaller and more rounded ICDs. The size and configuration of the capacitors is a major factor in achieving this goal.

In ICDs, as in other applications where space is a critical design element, it is desirable to use capacitors with the greatest possible capacitance per unit volume. As mentioned above, one way to increase capacitance per unit area in a flat capacitor is to etch the surface of the anode foil perpendicular to the surface thereof. An ICD with flat geometry electrolytic capacitors is described in U.S. Pat. No. 5,131,388 to Pless et al. ("the Pless patent"), which is incorporated herein by reference in its entirety. While such flat capacitors provide an improvement from a packaging and energy density standpoint, the energy or power density can still be greatly improved.

Conventionally, ICDs use two capacitors in series to achieve the desired high voltage for shock delivery. From the standpoint of size, it would be desirable to provide a capacitor arrangement for an ICD in a single package rather than two capacitors in series. However, this has not been possible since available anode foil technology has limited photo flash capacitor voltages to 400V or less.

It is important that the anode foil used in these capacitors maintains a high capacitance while at the same time has a reduced leakage current. The term "leakage current" refers to the current passing between an electrolyte and an anode foil. Under conventional anode foil preparation techniques, a barrier oxide layer is formed onto one or both surfaces of a metal foil by placing the foil into an electrolyte bath and applying a positive voltage to the metal foil and a negative voltage to the electrolyte. This formation process (also referred to as electrolysis) oxidizes the surface of the metal foil. The oxide film formed during formation normally has a thickness ranging from 0.006 to 1.0 micrometers ($\mu$m). However, the oxide film must be sufficiently thick to support the intended use voltage. This oxide film acts as a dielectric layer for the capacitor, a barrier to the flow of current between the electrolyte and the metal foil, thereby providing a high resistance to leakage current passing between the anode and cathode foils. However, a small amount of current, the leakage current, still passes through the barrier oxide layer. A high leakage current can result in the poor performance and reliability of an electrolytic capacitor. In particular, a high leakage current results in greater amount of charge leaking out of the capacitor once it has been charged.

Various attempts have been made to reduce the leakage current properties of oxides formed on anode foils. For example, in a conventional anode foil formation process, such as described in U.S. Pat. No. 5,449,448 issued to Kurihara et al (incorporated herein by reference), a hydration dip is utilized, where the aluminum foil is placed in a bath of heated pure water, followed by an organic acid "dip." Next, the barrier layer oxide is formed during electrolysis. The introduction of the organic acid dip into the formation process results in a reduced leakage current of the anode foil. However, the combination of the hydration dip and the organic acid dip also results in a reduced capacitance of the anode foil by as much as 7% or more.

ICDs are typically implanted in patients suffering from potentially lethal cardiac arrhythmias. Arrhythmia, meaning "without rhythm," denotes any variance from normal cardiac rhythm. Heartbeat irregularities are fairly common and many are harmless. A severe heartbeat irregularity known as ventricular tachycardia refers to a runaway heartbeat.

Fibrillation is an irregular rhythm of the heart caused by continuous, rapid, electrical impulses being emitted/discharged at multiple locations known as foci in the heart's atria and ventricles. Because a fibrillating heart is unable to properly pump blood through a patient's body, the longer a patient is in fibrillation, the greater the potential damage that can occur to the patient's heart. Thus, after the start of fibrillation, it is preferable to apply defibrillating therapy to the patient as soon as possible. An ICD is designed to apply such therapy automatically and quickly to minimize damage to the heart.

An ICD monitors cardiac activity and decides whether electrical therapy is required. For example, if a tachycardia is detected, pacing or cardioversion therapy may be used to terminate the arrhythmia. If fibrillation is detected, defibrillation is the only effective therapy.

Both cardioversion and defibrillation require that a high voltage shock be delivered to the heart. Since it is impractical to maintain high voltage continuously ready for use, ICDs normally charge energy storage capacitors after detection of an arrhythmia and prior to delivering a shock to the heart.

To shorten the time between arrhythmia onset and therapy, pulse discharge capacitors such as those in ICDs are required to charge quickly after protracted storage in the discharged state. Furthermore, they must resist damage due to the electrical and mechanical stresses of abrupt discharge from high voltages through low impedance loads.

SUMMARY OF THE INVENTION

The present invention provides an improved process for producing an anodic foil, wherein a high-stability crystalline anodic aluminum oxide is produced. According to one embodiment of the present invention, a method of producing an anodic foil for use in a capacitor comprises the steps of (a) anodizing the foil to produce a nano-porous amorphous oxide layer; and (b) hydrating the foil to convert said nano-porous amorphous oxide layer to a crystalline precursor layer. In another embodiment of the present invention, a method for producing an anodic foil for use in a capacitor comprises the steps of: (a) anodizing the foil; (b) hydrating the foil; and (c) forming a barrier oxide layer on said foil, wherein steps (a) and (b) are performed prior to step (c). The present invention also provides an anodic foil produced by the method described herein, an electrolytic capacitor comprising an anodic foil produced by the method described herein, and an implantable cardioverter defibrillator (ICD) comprising an electrolytic capacitor having an anodic foil produced by the method described herein.

The anodic aluminum oxide produced according the present invention is highly crystalline and has stability characteristics similar to amorphous oxide. The crystalline oxide layer formed according to the present invention has very high resistance to the boiling water ramp-build-time test. According to one embodiment of the present invention, the rise time (tVn) of the oxide layer formed according to the present invention after 2 hours of exposure to boiling water is less than about 15 seconds, and can be as low as about 1 to about 3 seconds. The methods of the present invention results in fast-charging capacitors that conserve battery energy in ICDs, shortened time between arrhythmia onset and therapy, and lower leakage current for reduced voltage droop after charging.

In a preferred embodiment of the present invention, a method of producing an anodic foil for use in a capacitor comprises the steps of: (a) anodizing said foil by placing said foil in an aqueous solution of an oxidizing acid at a temperature of about 15° C. to about 25° C. and applying a current; (b) hydrating said foil in a bath of deionized water at a temperature of about 80° C. to about 100° C.; (c) forming a barrier oxide layer on said foil by placing said foil in a first forming composition and applying a first voltage to said foil; (d) heat treating said foil; (e) reforming said barrier oxide layer on said foil by placing said foil in a second forming composition and applying a second voltage to said foil; and (f) dipping said foil in an aqueous solution of phosphoric acid. The present invention also provides an anodic foil produced by this method, an electrolytic capacitor comprising an anodic foil produced by this method, and an implantable cardioverter defibrillator (ICD) comprising an electrolytic capacitor having an anodic foil produced by this method.

Further features and advantages of the present invention, as well as the structure and operation of various embodiments of the present invention, are described in detail below with reference to the accompanying drawings.

BRIEF DESCRIPTION OF THE DRAWINGS/FIGURES

The accompanying drawings, which are incorporated herein and form part of the specification, illustrate the present invention and, together with the description, further serve to explain the principles of the present invention and to enable a person skilled in the pertinent art to make and use the invention.

Figure 4:
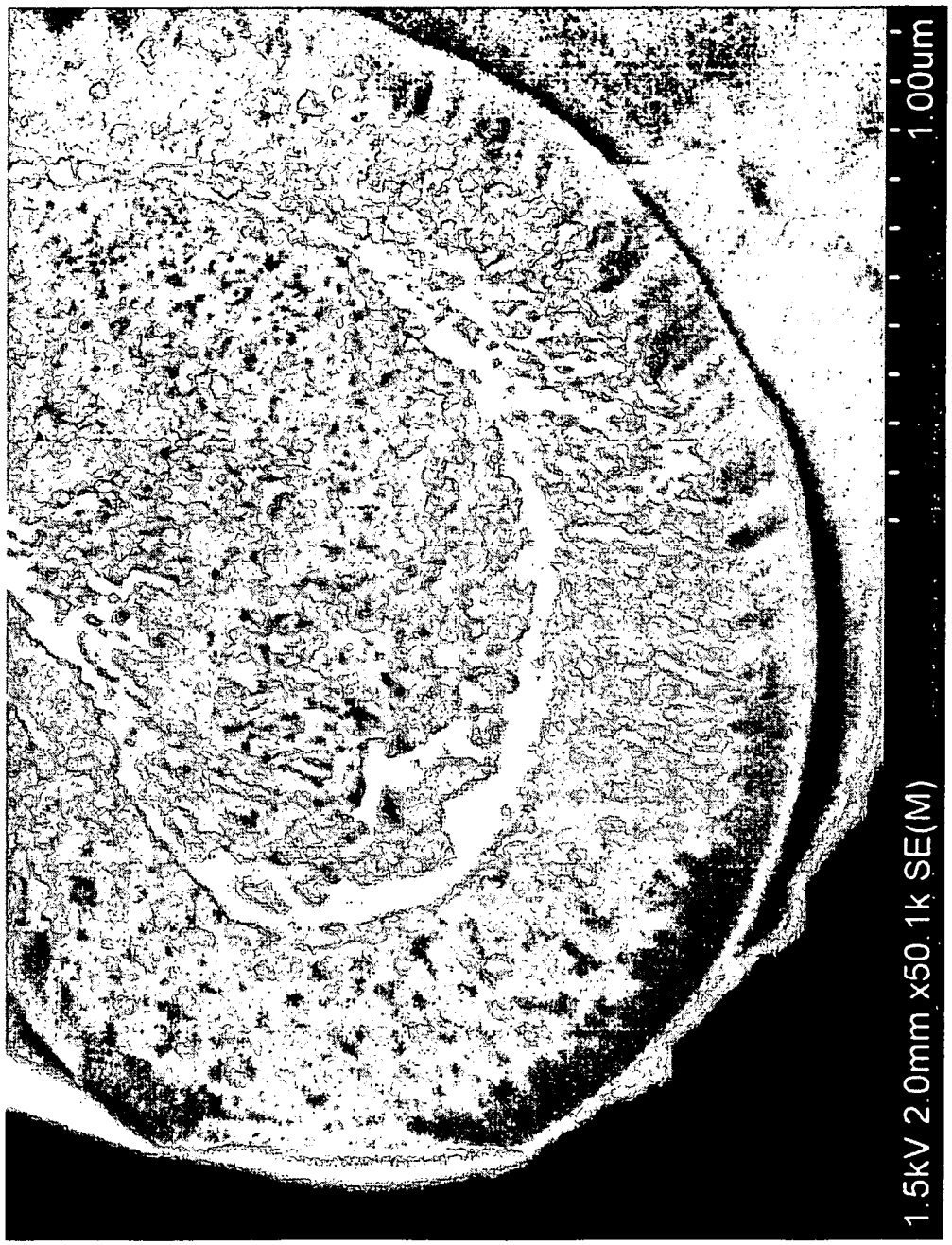

FIG. 4 shows an oxide cross-section of a sample produced according to the present invention wherein the porous oxide has been converted to a duplex structure with amorphous oxide (gray, featureless material) near the metal at the tunnel exterior and a crystalline layer (textured material) above it nearest the electrolyte channel in the tunnel. Residual hydrate and nano-porous oxide have been removed with phosphoric acid.

Figure 5:
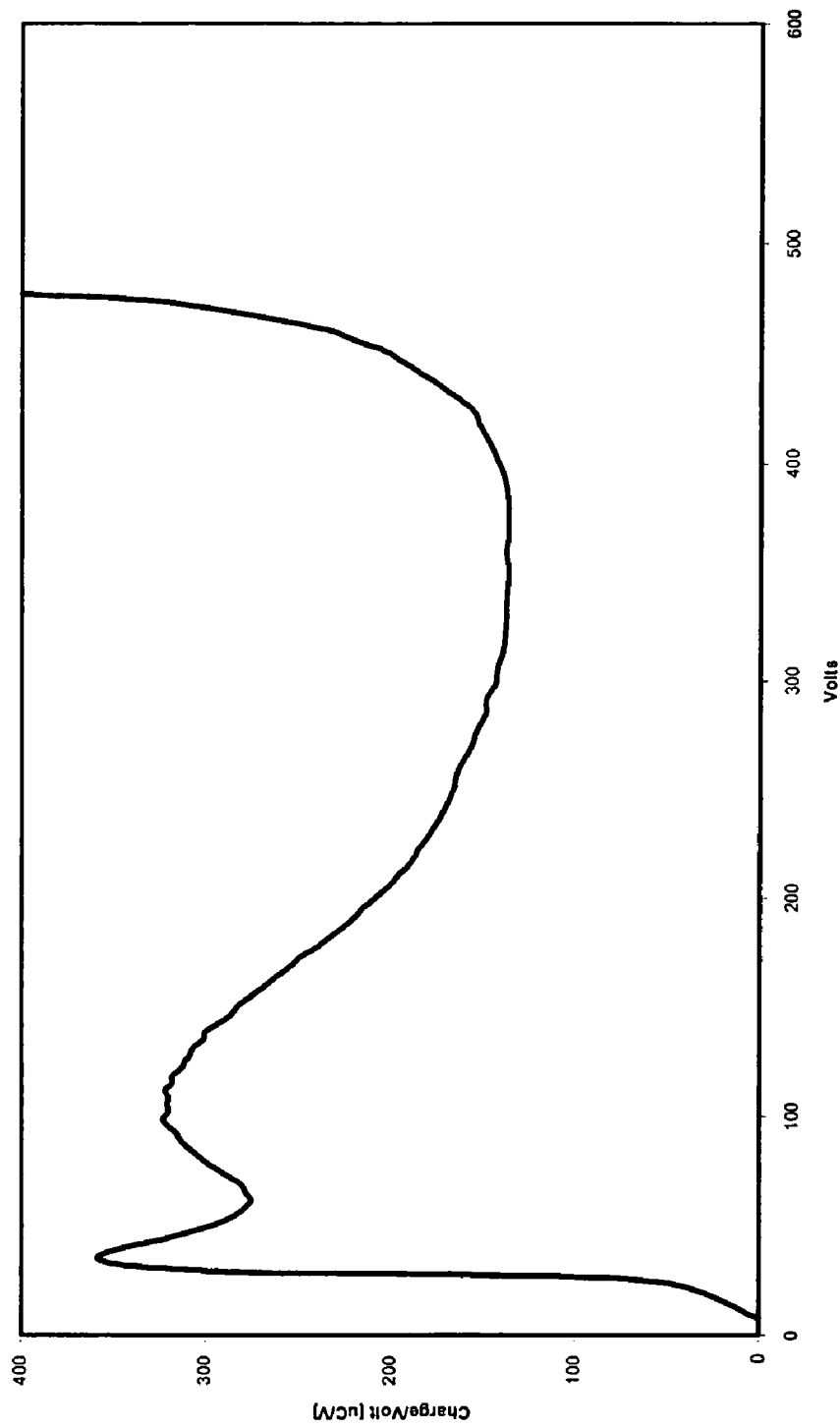

FIG. 5 shows typical results of rise times (tVn) after a 2 hour boil for crystalline oxide produced by a prior art process (for example, a rise time of 20.4 seconds).

Figure 6:
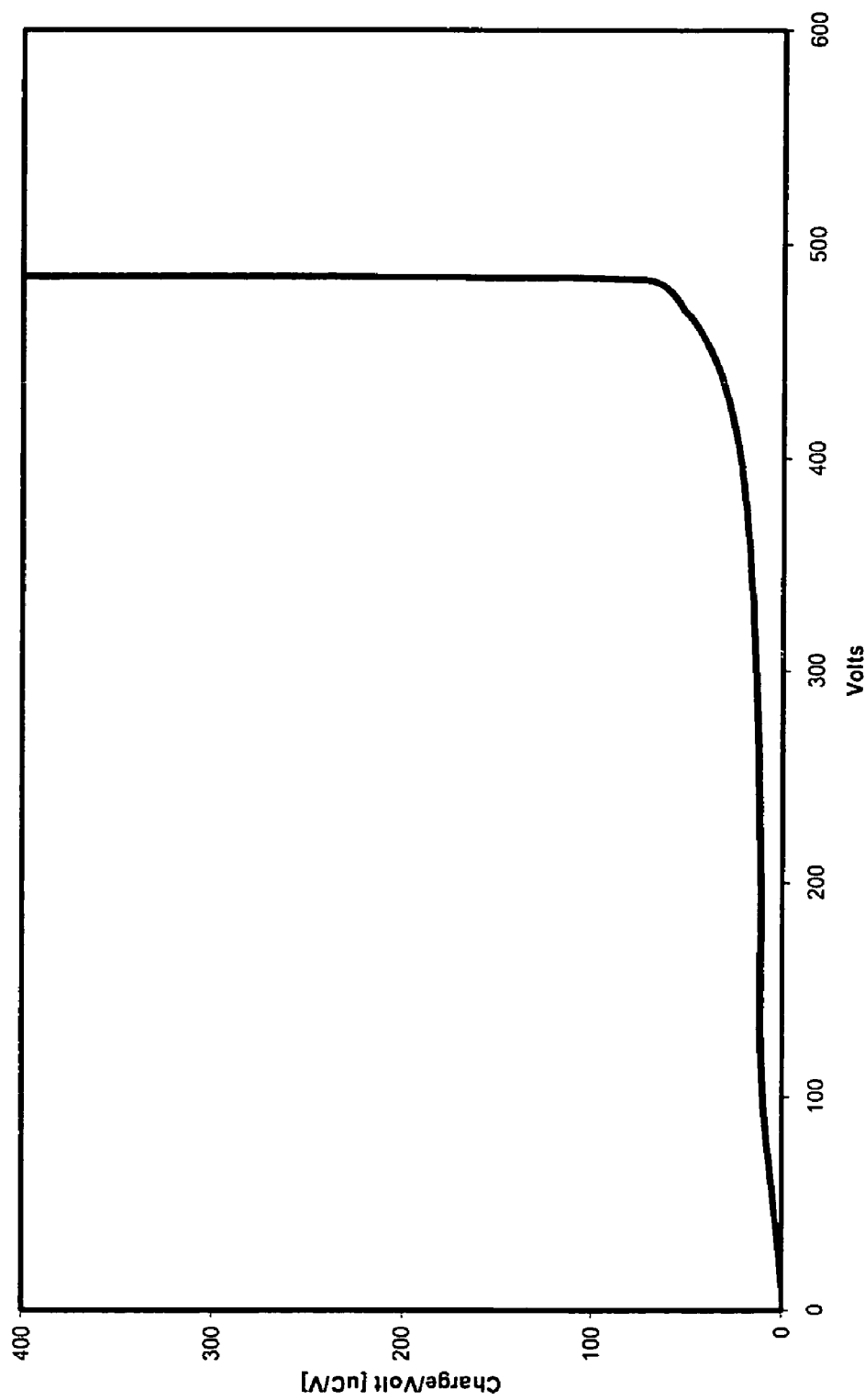

FIG. 6 shows typical results of rise times (tVn) after a 2 hour boil for anodized-hydrated oxide (for example, a rise time of 1.8 seconds).

Figure 7:
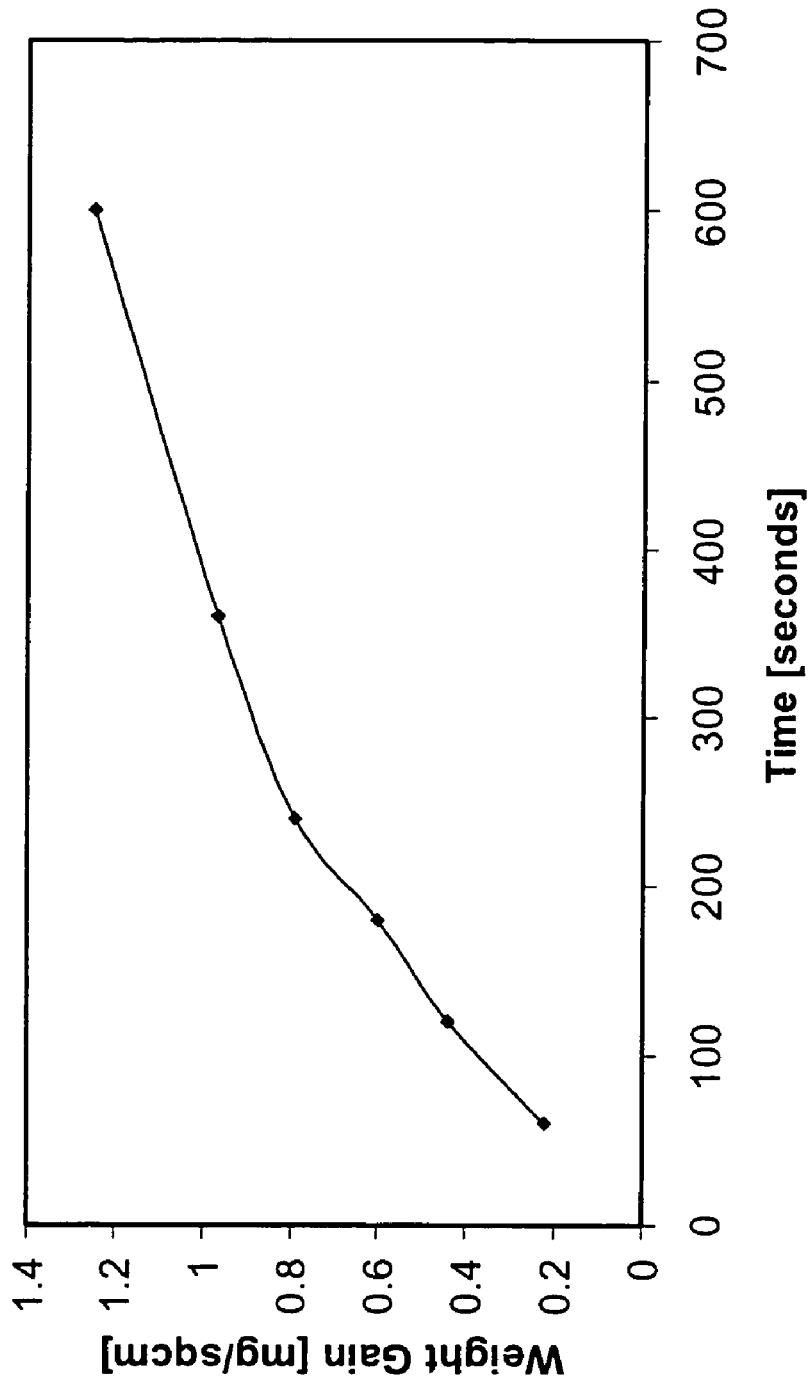

FIG. 7 shows a sample anodizing rate for anodization carried out in 20% $H_2SO_4$ solution, at 20° C. and 200 mA/cm².

Figure 8:
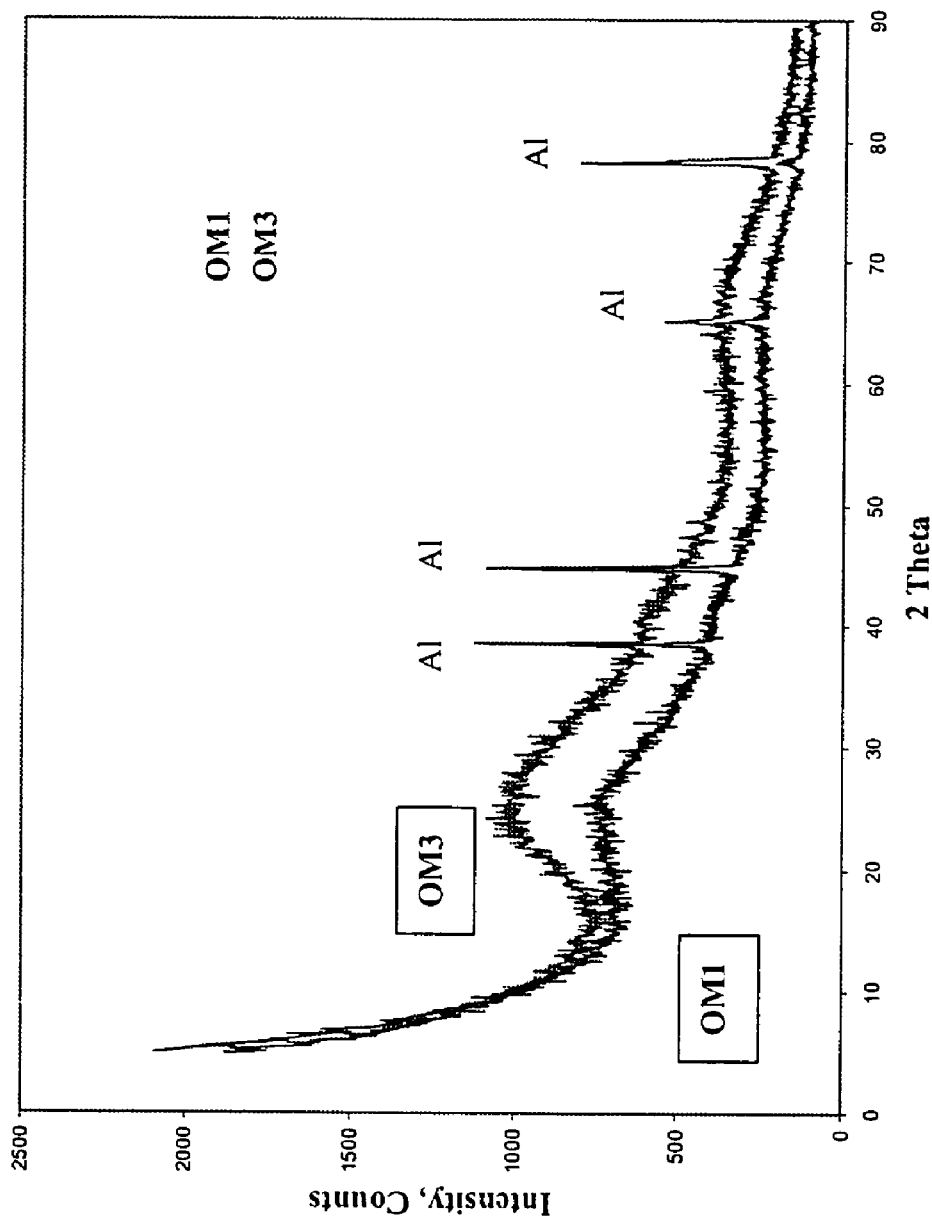

FIG. 8 shows XRD data for anodization carried out for 4 minutes in 20% $H_2SO_4$ solution, at 20° C. and 200 mA/cm².

Figure 9:
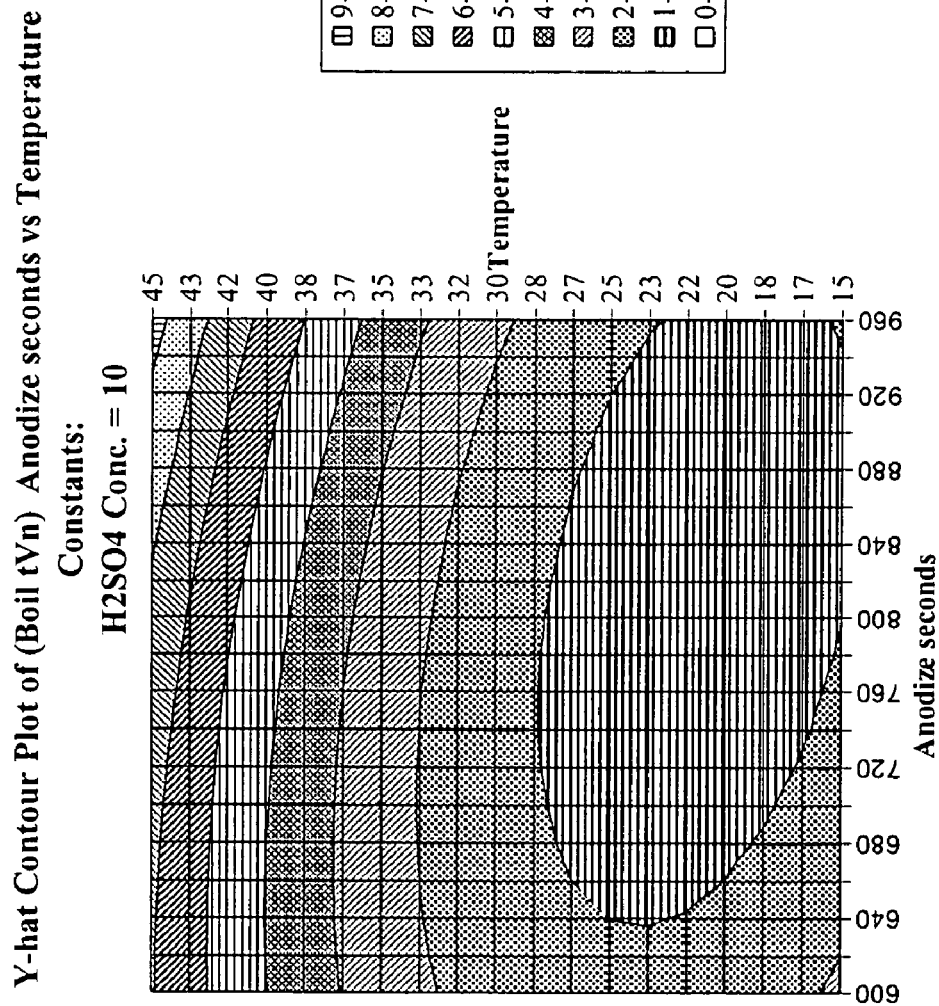

FIG. 9 is a contour plot of tVn (rise time) after a 2-hour boil for anodization duration (in seconds) versus temperature (° C.) at a constant $H_2SO_4$ concentration of 10%.

Figure 10:
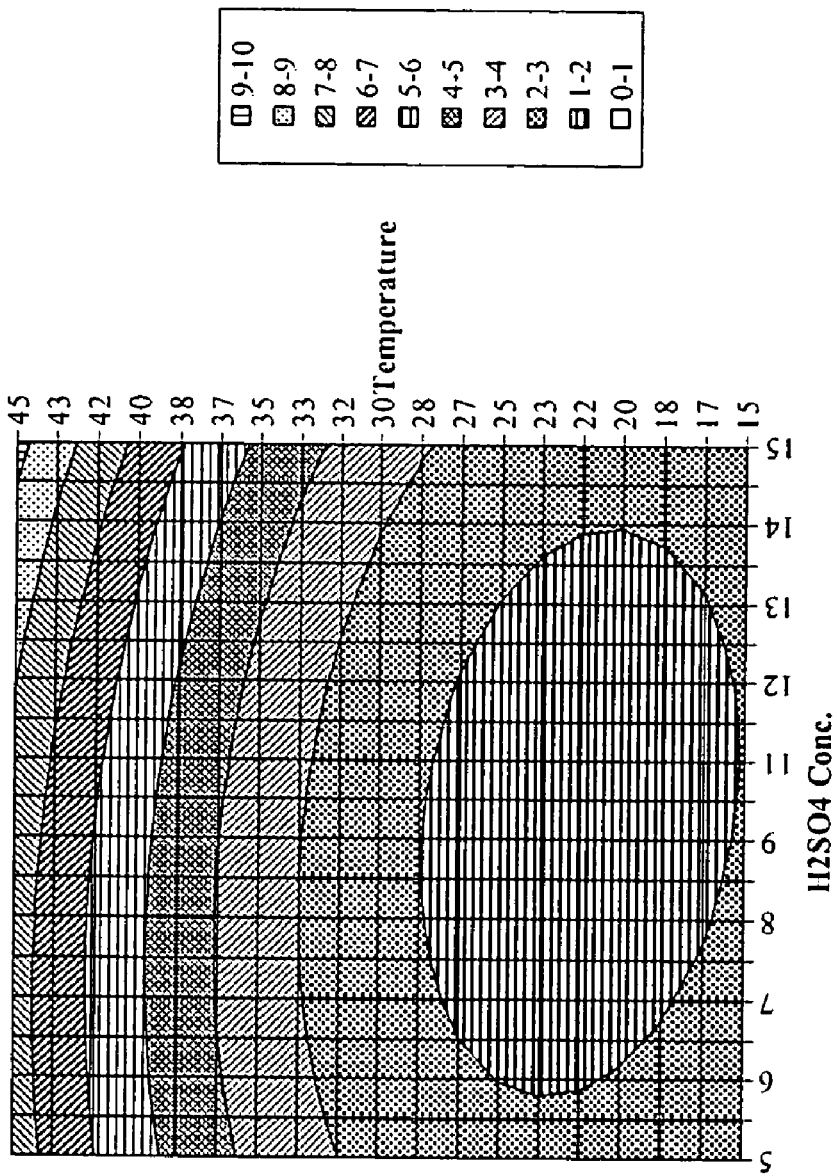

FIG. 10 is a contour plot of tVn (rise time) after a 2-hour boil for $H_2SO_4$ concentration versus temperature (° C.) at a constant anodization duration of 780 seconds.

DETAILED DESCRIPTION OF THE INVENTION

The present invention relates to a process for producing an anodic foil with a high-stability crystalline anodic aluminum oxide for use in a capacitor. The present invention also provides an anodic foil produced by the method described herein, an electrolytic capacitor comprising an anodic foil produced by the method described herein, and an implantable cardioverter defibrillator (ICD) comprising an electrolytic capacitor having an anodic foil produced by the method described herein.

Preferred embodiments of the present invention are now described. While specific configurations and arrangements are discussed, it should be understood that this is done for illustrative purposes only. A person skilled in the relevant art will recognize that other configurations and arrangements can be used without departing from the spirit and scope of the invention. It will also be apparent to a person skilled in the relevant art that this invention can be employed in a variety of other devices and applications.

1. Overview and Discussion of the Invention

Conventional aluminum electrolytic capacitors are normally produced with highly etched aluminum anode foil which has been completely covered (formed) with highly crystalline anodic aluminum oxide. This crystalline oxide permits operation at very high fields (very thin oxides for a given applied voltage) resulting in the highest capacitance per unit area available. This highly crystalline oxide is normally produced for high voltage use by hydrothermal conversion (hydration) of the etched foil surface to produce a layer of nano-crystalline pseudoboehmite directly on the aluminum metal substrate prior to formation in a hot solution such as boric acid and its salts, a phosphate salt or one of many organic acids known to those skilled in the art such as adipic, sebacic, azelaic, suberic, citric, etc. or their salts. Although this hydration step may be omitted, the resulting foil capacitance tends to be reduced due to lower crystallinity of the oxide. In addition, these crystalline oxides contain high levels of tensile stresses and defects/voids that must be relaxed and repaired in processes commonly known as degassing, depolarization or relaxation (typically heat treatments and/or exposure to hot water or aggressive chemicals such as acids or bases) followed by anodic reformation. Often, these relaxation and reformation steps must be repeated multiple times in order to reduce the stresses and void levels in the oxide to the point that any further relaxation of the oxide in the finished capacitor will be minor and can be repaired without danger of overheating.

In critical applications of very high electrical and mechanical stresses such as photoflash and strobe situations, the capacitors traditionally have been built with an anode foil formed with lower capacitance amorphous anodic aluminum oxide. Although the capacitance is approximately 40% lower than that of crystalline oxide, the level of defects or voids is very low. In addition, the stress is low and of a compressive nature. Capacitors made with this type of oxide suffer little relaxation due to flashing so that leakage currents remain low. In addition, capacitors with amorphous oxide can be stored for long periods of time with little or none of the self-relaxation of the oxide (sometimes called deformation) that increases the time required to charge the capacitor to the desired voltage. This type of oxide is sometimes formed on highly etched and passivated aluminum foils without hydration using passivating formation solutions such as phosphates, silicates, cooler solutions of borates in water or organic solvents or mixtures of passivators with organic acids/salts such as adipate, sebacate, azelate, suberate, citrate, etc. Frequently, amorphous oxides are produced by anodizing highly etched aluminum foils in common commercial anodizing solutions such as sulfuric, oxalic, phosphoric, tartaric or other oxidizing acids prior to formation in the above-mentioned amorphous-oxide-forming solutions. Anodizing produces a nano-porous, entirely-amorphous coating on the entire aluminum etched surface that serves as the beginning point for conversion to amorphous barrier oxides in the forming process. Formation after anodization serves to fill the pores with barrier oxide of an amorphous nature to prevent the formation of voids and tensile stresses.

Since the 40% capacitance penalty associated with amorphous oxide would increase the size of capacitors in ICD and other space-sensitive applications by a similar amount, amorphous oxide typically has not been used, and the savings in battery energy and charge time have been forfeited. Ideally, crystalline oxide foils should be able to charge as quickly as amorphous oxide if the relaxation damage (deformation) could be greatly reduced or eliminated.

Figure 1:
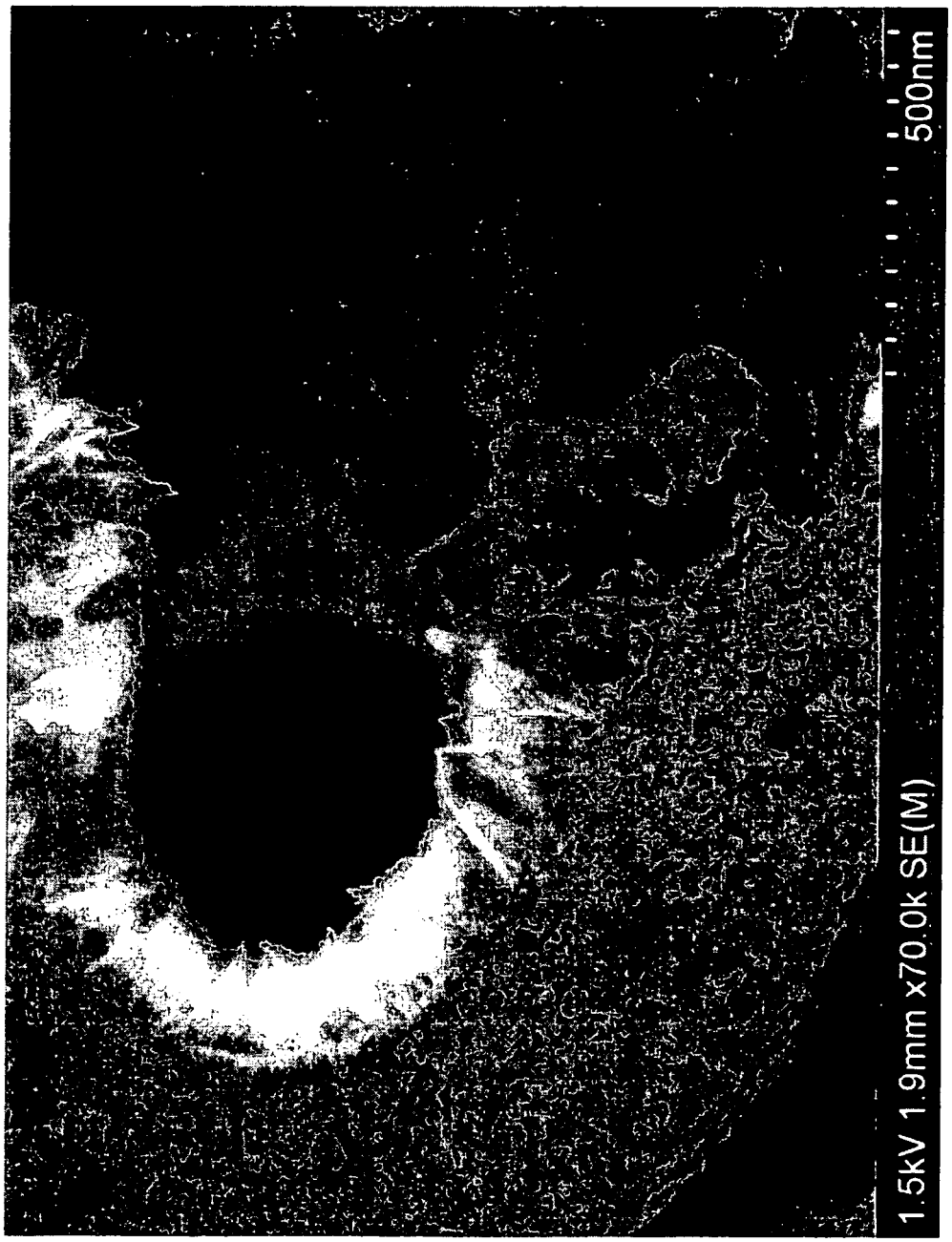
FIG. 1 shows a broken tunnel cross-section of a typical crystalline oxide foil.

The hydration step used to initiate highly crystalline oxide produces a duplex layer of pseudoboehmite on the surface of the etched capacitor foil. The lower 200 to 300 nanometers (nm) of this layer are dense and compact while the upper portion is composed of an array of lower density platelet structures of the same pseudoboehmite material. X-Ray Diffraction (XRD) studies have shown that this pseudoboehmite is crystalline and is converted to crystalline barrier-type gamma-prime aluminum oxide in the formation process by field-assisted dehydration. FIG. 1 shows a broken-tunnel oxide cross-section of a typical crystalline oxide foil. Note the highly textured appearance of the crystalline barrier portion and the platelet-structured residual hydrate on the tunnel interior.

Stability studies have shown that the anodic conversion of this hydrate to barrier oxide leads to shrinkage of the layer during formation. This shrinkage leads to the tensile stresses and the voids seen in transmission electron microscope (TEM) studies. The majority of the voids form in the upper portions of the anodic layer where the lower density pseudoboehmite has been converted to crystalline barrier aluminum oxide.

Since the longer charge times of the crystalline anodic oxide are associated with repairing the stress-relaxation cracks and the voids that are exposed during this cracking, the present invention provides a process for preparing the surface of the aluminum foil, preferably etched, with a layer that is more dense and easily converted to crystalline alumina than the normal pseudoboehmite hydration layer. These treatments are applied prior to conversion in a barrier layer formation step.

Figure 2:
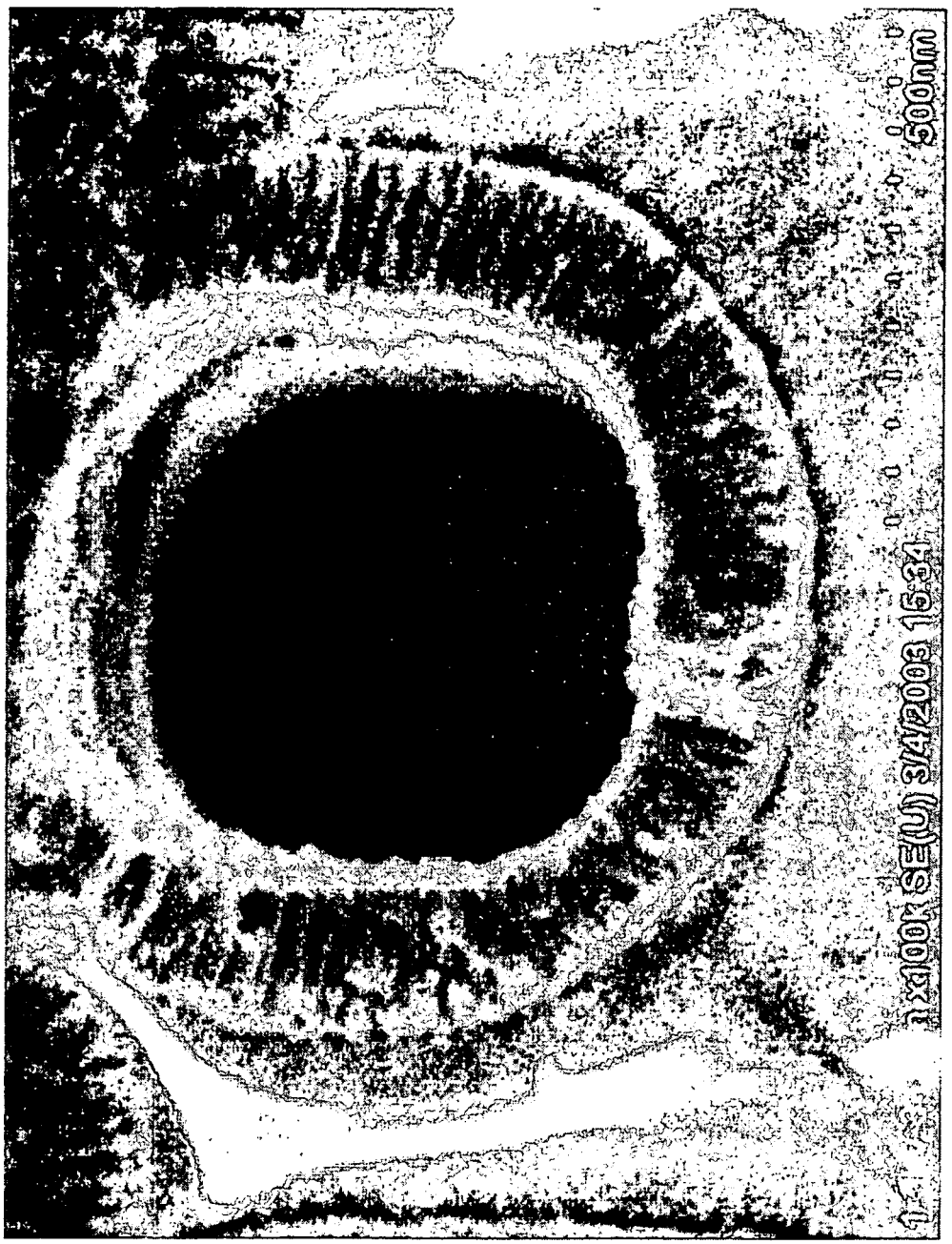
FIG. 2 shows a broken tunnel cross-section of a sulfuric-acid-anodized nano-porous oxide.

According to the present invention, an anodization procedure is used to deposit a layer of amorphous, nano-porous oxide with a thickness of the same order as that of the final barrier layer desired, preferably about 1 nm per volt of crystalline barrier oxide formation. Early trials with sulfuric acid anodizing have produced such layers with fine nano-pores of the order of about 50–1000 nanometers extending almost to the metal surface that are amorphous by XRD measurements. FIG. 2 shows a broken tunnel photo of sulfuric-acid-anodized nano-porous oxide with the characteristic radial pores extending from the metal out to the electrolyte channel in the tunnel. The anodization process not only deposits nano-porous oxide but also dissolves an appreciable amount of aluminum metal. Also the anodized oxide grows almost exclusively into the metal and does not occlude the tunnel pore opening. Therefore, the amount of tunnel widening (typically performed in nitric acid or other nitrates) needs to be reduced so that the final tunnel diameter (as a result of etching plus widening plus anodizing) is of the correct size to accommodate the barrier oxide without blocking the tunnel tips or result in excess tunnel merging which increases the brittleness.

Figure 3:
FIG. 3 shows pseudoboehmite on the interior of the tunnel on top of the nano-porous oxide after the hydration step.

According to the present invention, a hydration procedure follows the anodization procedure. In one embodiment of the invention, hydrothermal treatment (hydration) in hot de-ionized water for about 12 minutes is used in order to convert the nano-porous amorphous oxide layer to a crystalline precursor layer. XRD studies have shown that this hydrothermal treatment induces at least a partial crystallization of the nano-porous oxide. Scanning Electron Microscopy (SEM) studies have shown that the pore mouths, if not the entire pore lengths, are sealed with pseudoboehmite to discourage the penetration of the acid species into the pore during the conversion to barrier oxide in the succeeding formation step. Published reports (for example, Lopez, V. et al., *Surface and Coating Technology*, 154:34–41 (2002)) indicate that the nano-pores are filled with aluminum hydroxide gel. In FIG. 3, the pseudoboehmite can be seen on the interior of the tunnel on top of the nano-porous oxide after the hydration step. A covering of pseudoboehmite is needed to reduce the incorporation of acid species during formation so that crystallization is maximized. Thermal or electron-beam crystallization of amorphous oxide is affected by regions of high incorporation of the anionic acid species from the formation solution.

The anodization and hydration procedures are then followed by the normal barrier layer formation process to the desired formation voltage. In one embodiment of the invention, approximately 430–485 volts are used. XRD and SEM studies have shown that barrier oxides can be produced according to the present invention with varying degrees of crystallinity up to nearly fully crystalline with very high stability against the boiling water test normally used to assess the tendency for self-relaxation/deformation to occur. FIG. 4 shows an oxide cross-section of a sample produced according to the present invention wherein the porous oxide has been converted to a duplex structure with amorphous oxide (gray, featureless material) near the metal at the tunnel exterior and a highly crystalline (textured) layer above it nearest the electrolyte channel in the tunnel. Residual hydrate and nano-porous oxide have been removed with phosphoric acid in this case after formation as discussed below.

Ramp-build-time test contour plots of rise time (tVn) after a 2 hour boil have been used to conduct stability studies to assess the tendency for self-relaxation/deformation to occur as discussed below. Rise times are in the range of 20–30 seconds after exposing 10 cm$^2$ formed samples to boiling water for 2 hours in the case of normal crystalline oxide produced by a conventional citric acid forming process and much higher with commercial processes. FIG. 5 shows typical results of tVn after a 2 hour boil for crystalline oxide produced by a conventional citric acid forming process. The composite anodized-hydrated oxides produced by the process according to the present invention had rise times as low as 2 seconds when exposed to boiling water for 2 hours. The present invention showed little indication of the immediate, high baseline present in prior oxides, caused by delamination of the oxide from the base metal seen in stress relaxation cracking, or of a "hump" in the curve caused by the repair of voids exposed by the cracking. FIG. 6 shows the relatively low, flat build test curve for the composite anodized-hydrated oxide of the present invention that implies a very low level of defects/voids and tensile stresses typically found only in amorphous aluminum oxides.

The novel combination of the nano-porous anodizing step (used to produce amorphous oxides) with a hydrothermal treatment process according to the present invention, to convert the nano-porous amorphous oxide layer to a suitable, compact nano-crystalline precursor layer prior to a standard formation process, provides an improved process for the production of very high-stability crystalline anodic aluminum oxide for electrolytic capacitors. According to the present invention, a highly crystalline oxide layer is formed with stability characteristics similar to amorphous oxide and capacitance within 85% to 95% of that of standard crystalline oxide, versus the 60% level seen for conventional amorphous oxide. A high degree of crystallinity with very high resistance to the boiling water ramp-build-time test is a distinguishing characteristic of the formation process of the present invention. High resistance to the formation of a pseudoboehmite layer on the exterior of the oxide formed by this process is also a unique characteristic of the present invention where high levels of passivators such as phosphate or silicate are not incorporated in the oxide.

In one embodiment, an electrolytic capacitor comprising the anodic foil produced according to the present invention is constructed of anode and cathode layers, stacked with a paper insulator or spacer between each layer. The anode layer is composed of two or more anode foils stacked together without any paper spacer, to form a high energy density anode element. Preferably, aluminum anode foil is employed, that has been etched and formed at voltages of 400 to 500 volts, with an effective formation voltage of 450 volts. The cathode layer is preferably an aluminum or titanium foil or titanium nitride film cathode. The anode and cathode layers are then grouped together in a parallel connection to produce sufficient capacitance for the intended function. This finished stack is inserted into a case with a geometry closely following the contour of the stack, and designed to minimize the space occupied inside the finished defibrillator.

In an alternate embodiment of the present invention, the capacitor comprising the anodic foil produced according to the present invention may be a traditionally designed wound roll capacitor in either a cylindrical or flattened cylindrical shape. The anode foil in this embodiment typically has a lower capacitance per square centimeter of projected area than a flat capacitor stack design, due to the fact that the anode foil must have enough strength to be rolled. Very thin rolls of aluminum or other valve metal foil are used as the anode and cathode layers, with a separator interposed therebetween. The entire laminate is rolled up into the form of a substantially cylindrical body, or wound roll, that is held together with adhesive tape and is encased, with the aid of suitable insulation, in an aluminum tube or canister.

2. Anodization and Formation of a Nano-Porous Amorphous Oxide Layer

The present invention provides a method of producing an anodic foil for use in a capacitor which comprises the steps of anodizing the foil and hydrating the foil. In one embodiment of the present invention, the method of producing an anodic foil for use in a capacitor comprises the steps of: (a) anodizing the foil; (b) hydrating the foil; and (c) forming a barrier oxide layer on said foil, wherein steps (a) and (b) are performed prior to step (c).

According to one embodiment of the present invention, either etched or non-etched aluminum foil may be utilized. In a preferred embodiment of the present embodiment, etched aluminum foil is utilized. Etched foil has an increased surface area. By increasing the surface area of the aluminum foil, capacitance can be increased.

Aluminum foil is preferred for the anode layers, because of its ability to produce a sufficient quality oxide layer, its conductive properties, and its wide commercial availability. Other valve metal foils conventionally utilized in electrolytic capacitors could also be used, including titanium, tantalum, magnesium, niobium, zirconium and/or zinc. Preferably, a strip of unetched, high purity (99.99%) aluminum foil with high cubicity, wherein at least 85% of the crystalline aluminum structure is oriented in a normal position (i.e., a (1,0,0) orientation) relative to the surface of the foil, is used. It is also possible to use a sheet of foil while retaining strength in the foil. Such foils are well-known in the art and are readily available from commercial sources known to those skilled in the art.

In a preferred embodiment of the present invention, the anode foil may be etched in an aqueous halide based etch solution, typically a hydrochloric acid or sodium chloride solution, according to a conventional etch process; for example, U.S. Pat. No. 5,715,133 to Harrington et al. describes a suitable method of etching foil and is incorporated herein by reference in its entirety. The etch solution preferably consists of about 1.3% by weight sodium chloride, about 3.5% by weight sodium perchlorate, about 0.35% sodium persulfate, and deionized water. The etch solution preferably is heated to a temperature in the range of about 60° C. to about 95° C. The foil is etched at a DC current density of about 0.01 A/cm$^2$ to about 0.30 A/cm$^2$. A charge of about 20 coulombs/cm$^2$ to 100 coulombs/cm$^2$ is passed through the foil during the etching process, which requires an etch time in the range of about 2 minutes to about 12 minutes.

The foil is then removed from the etch solution and rinsed in deionized water. The tunnels formed during the initial etch are then widened, or enlarged, in a secondary etch solution, typically an aqueous based nitrate solution, preferably between about 1% to about 20% aluminum nitrate, more preferably between about 10% to about 14% aluminum nitrate, with less than about 1% free nitric acid. The etch tunnels are widened to an appropriate diameter by methods known to those in the art, such as that disclosed in U.S. Pat. No. 4,518,471 and U.S. Pat. No. 4,525,249, both of which are incorporated herein by reference. As discussed previously, the amount of tunnel widening is preferably reduced to accommodate the fact that the anodized oxide grows almost exclusively into the metal and does not occlude the tunnel pore opening.

After the etch tunnels have been widened, the foil is again rinsed with deionized water and dried.

In a preferred embodiment, the anodizing step of the present invention comprises dipping the foil in an anodizing composition and applying a current to form a nano-porous amorphous oxide layer on the foil. Preferably, the anodizing composition comprises an aqueous solution of an oxidizing acid such as sulfuric acid, oxalic acid, phosphoric acid, and tartaric acid. More preferably, the anodizing composition comprises an aqueous solution of sulfuric acid.

In one embodiment of the invention, the anodizing composition used in the anodizing step comprises from about 1% to about 50% by weight of the oxidizing acid. Preferably, the anodizing composition comprises about 5% to about 20% by weight of the oxidizing acid. More preferably, the anodizing composition comprises about 10% to about 20% by weight of the oxidizing acid. More preferably, the anodizing composition comprises about 10% by weight of the oxidizing acid.

The current applied in the anodizing step, the amount of time the foil is anodized, and the temperature at which the foil is anodized can be varied and optimized, as would be apparent to one of skill in the art. Currents applied are preferably in a range of 10–1000 mA/cm$^2$, more preferably 50–250 mA/cm$^2$. In a preferred embodiment, the current applied is about 200 mA/cm$^2$. Preferably, the anodizing step is carried out for a time duration of about 5 minutes to about 10 minutes at a current of about 200 mA/cm$^2$. More preferably, the anodizing step is carried out for a time duration of about 6 minutes to about 7 minutes at a current of about 200 mA/cm$^2$. Preferably, the anodizing step is carried out at a temperature of about −25° C. to about 45° C. More preferably, the anodizing step is carried out at a temperature of about 15° C. to about 25° C.

According to the method of the present invention, the thickness of the nano-porous amorphous oxide resulting from the anodizing step can be varied in accordance with the desired thickness of the final barrier oxide layer. In one embodiment of the present invention, the nano-porous amorphous oxide layer has a thickness of about 300 nm to about 700 nm. Preferably, the nano-porous amorphous oxide layer has a thickness of about 350 nm to about 500 nm. More preferably, the nano-porous amorphous oxide layer has a thickness of about 500 nm.

In a preferred embodiment, the anodized foil is rinsed prior to hydration. Preferably, the anodized foil is rinsed in an overflow bath of deionized water prior to hydration. According to a preferred embodiment, a thorough rinsing of the foil is helpful in reducing the likelihood of contamination of subsequent formation mixtures and solutions.

3. Hydration and Crystallization of the Nano-Porous Amorphous Oxide

According to a preferred embodiment of the present invention, hydration is used to convert the nano-porous amorphous oxide to a crystalline precursor material for later formation of a barrier oxide layer. Preferably, the hydrating step comprises dipping the foil in a bath of deionized water at a temperature of about 85° C. to about 100° C. More preferably, the hydrating step comprises dipping the foil in a bath of deionized water at a temperature of about 95° C.

The time duration of the hydrating step can vary depending on the temperature at which the hydrating step is performed, as would be apparent to one of skill in the art. Generally, less time is needed to complete the hydrating step at higher temperatures. In a preferred embodiment of the present invention, the hydrating step is carried out for a time period of about 1 minute to about 3 hours. Preferably, the hydrating step is carried out for a time period of about 6 minutes to about 12 minutes.

4. Barrier Oxide Layer Formation

According to the method of the present invention, the anodization and hydration steps are followed by a barrier oxide layer formation process, as is known in the art. A barrier oxide layer is formed onto one or both surfaces of the metal foil by placing the foil into an electrolyte bath and applying a positive voltage to the metal foil and a negative voltage to the electrolyte. The barrier oxide layer provides a high resistance to current passing between the electrolyte and the metal foils in the finished capacitor, also referred to as the leakage current. A high leakage current can result in the poor performance and reliability of an electrolytic capacitor. In particular, a high leakage current results in greater amount of charge leaking out of the capacitor once it has been charged.

The formation process consists of applying a voltage to the foil through an electrolyte such as boric acid and water or other solutions familiar to those skilled in the art, resulting in the formation of an oxide on the surface of the anode foil. The preferred electrolyte for formation is a 100–1000 µS/cm, preferably 500 µS/cm, citric acid concentration. In the case of an aluminum anode foil, the formation process results in the formation of aluminum oxide ($Al_2O_3$) on the surface of the anode foil. The thickness of the oxide grown or "formed" on the anode foil is proportional to the applied voltage, roughly 10 to 15 Angstroms per applied volt.

In one embodiment of the present invention, the forming step comprises placing the anodized and hydrated foil in a first forming composition at a first applied voltage. Preferably, the forming composition comprises an aqueous solution of low concentration citric acids. Also preferably, the forming composition comprises an aqueous solution of low concentration carboxylic acids.

Many variations in the combination of the forming composition and the voltage applied in the forming step are known in the art. In a preferred embodiment of the present invention, the applied voltage in the forming step is about 400 Volts to about 500 Volts. Preferably, the applied voltage is about 430 Volts to about 485 Volts. In another preferred embodiment of the present invention, the forming step is carried out at a temperature of about 85° C. to about 100° C., preferably of about 85° C.

In a preferred embodiment of the present invention, the forming step further comprises heat treating the foil (also known as heat relaxation of the foil). The heat treatment can be carried out after each formation step and after each subsequent reformation step(s) and the heat treatment can be carried out after the last reformation step is completed. The heat treatment performed after the final reformation step is also known as the final anneal. Preferably, the heat treatment is carried out after each formation step and after each reformation step. In a preferred embodiment of the present invention, the heat treating is carried out at a temperature of about 350° C. to about 550° C. for a time duration of about 1 minute to about 10 minutes. In another preferred embodiment of the present invention, the annealing of the foil (heat treating the foil after the final reformation step is completed) is preferably carried out at a temperature of about 250° C. to about 350° C. for a time duration of about 1 minute to about 5 minutes. Variations in the temperature and duration of the heat treating process will be apparent to one of skill in the art.

In another preferred embodiment of the present invention, the forming step further comprises a phosphoric acid treatment (also known as phosphoric acid stripping) which comprises dipping the formed foil in an aqueous solution of phosphoric acid. The phosphoric acid cleans the foil tunnel, passivates the remaining oxides, and stabilizes the oxides formed. The passivation of the foil protects the foil surface from further hydration inside the capacitor. The phosphoric acid treatment can be carried out after the forming step or after the subsequent reforming step(s). After the phosphoric acid treatment of the formed foil, the foil can be treated with an additional reforming step. Preferably, the formed foil is dipped in an aqueous solution comprising about 1% to about 10% by weight of phosphoric acid for a time duration of about 4 minutes to about 12 minutes at a temperature of about 50° C. to about 70° C.

In a preferred embodiment of the present invention, the forming step further comprises both a heat treatment and a phosphoric acid treatment of the foil. It is possible to perform the heat treatment prior to the phosphoric acid treatment or to perform the phosphoric acid treatment prior to the heat treatment. Preferably, the heat treatment is performed prior to the phosphoric acid treatment.

According to a preferred embodiment of the present invention, the forming step further comprises reforming the barrier oxide layer on the foil. By using reform steps, a high quality oxide is produced with low leakage current properties. Preferably, the reforming comprises dipping the foil in a second forming composition at a second applied voltage. It is desirable to rinse the foil prior to reforming the barrier oxide layer on the foil. Preferably, the foil is rinsed in an overflow bath of deionized water prior to reforming the foil.

In another preferred embodiment of the present invention, the step of forming the barrier oxide layer on the anodized and hydrated foil is followed by the steps in the following order: (i) heat treating the foil in a first heat treating step; (ii) reforming the barrier oxide layer on the foil in a first reforming step; (iii) heat treating the foil in a second heat treating step; (iv) reforming the barrier oxide layer on the foil in a second reforming step; (v) heat treating the foil in a third heat treating step; (vi) reforming the barrier oxide layer on the foil in a third reforming step; (vii) heat treating the foil in a fourth heat treating step; (viii) dipping the foil in an aqueous solution of phosphoric acid; (ix) reforming the barrier oxide layer on the foil in a final reforming step; and (x) heat treating the foil in a final anneal step.

The etched and formed anode foils are cut and the capacitor assembled as discussed above. The pre-assembled capacitor is then vacuum impregnated with an electrically conductive electrolyte, by placing the capacitor in contact with the electrolyte and reducing the pressure to less than 50 cm Hg. The capacitor electrolyte is typically ethylene glycol based with a straight chain dicarboxlyic acid and/or boric acid. The capacitor is held at this low pressure for 5 to 45 minutes and then pressure is restored, using the pressure to force the electrolyte mixture into the capacitor stack. The capacitor is then removed and placed in an oven at a temperature of about 65° C. to about 90° C. and a maximum oxygen atmospheric concentration of 2% for a period of about 2 hours to about 24 hours. The capacitor is then aged in a normal manner by applying the working voltage to the capacitor, allowing the capacitor to reach this voltage, and then allowing the current to decrease.

Electrolytic capacitors according to the present invention can be incorporated into implantable medical devices, such as implantable cardioverter defibrillators (ICDs), as would be apparent to one skilled in the art, as described in U.S. Pat. No. 5,522,851.

5. Ramp-Build-Time Test of the Resulting Anodic Foil

The ramp-build-time test is used as an indicator of the charging times and stability of the anodized-hydrated oxides produced by the method described herein. The anodic foils are boiled for 2 hours and the rise times (tVn) of the oxides formed on the foil are measured. After 2 hours of exposure to boiling water, the anodic foil produced by the method of the present invention has an oxide layer with a rise time of less than about 20 seconds, preferably of less than about 15 seconds, more preferably of less than about 10 seconds, more preferably of less than about 5 seconds, more preferably of about 1 second to about 3 seconds.

EXAMPLES

Example 1

Anodization of Aluminum Foil Prior to Photoflash Formation

Samples of 10 $cm^2$ aluminum foil (having a dogbone shape) were taped at the neck to inhibit air/water line corrosion. The sample foils were anodized in a solution of 20% $H_2SO_4$ which was held at 15–20° C. by deionized water cooling and water jacket around a 1 liter stainless steel beaker. A current of 200 $mA/cm^2$ was applied (2 A/10 $cm^2$ foil on both sides of the foil) for various times. The initial weights and final weights of the foil samples were measured. Results are shown in Table 1.

TABLE 1

| Current Density (mA/cm$^2$) | Time (seconds) | Initial Weight (grams) | Final Weight (grams) |
|---|---|---|---|
| 200 | 60 | 0.4090 | 0.4112 |
| 200 | 120 | 0.4026 | 0.4070 |
| 200 | 180 | 0.4004 | 0.4064 |
| 200 | 240 | 0.4035 | 0.4114 |
| 200 | 360 | 0.4094 | 0.4191 |
| 200 | 600 | 0.3574 | 0.3699 |

Field Emission Scanning Electron Microscopy (FE-SEM) studies were conducted on the samples. Resolution of the porous oxide down to 5 nm pores was achieved and a layer of amorphous oxide with a thickness of 150–200 nm was observed in the 4 minute sample.

Example 2

FE-SEM and XRD Studies of Anodized Foil

The 4 minute and 10 minute samples from Example 1 were further examined. Broken foil cross-sections of these two samples were studied using Field Emission Scanning Electron Microscopy (FE-SEM), which gave multiple measurements of porous oxide thickness of 170±20 nm for the 4 minute samples and 420±50 nm for the 10 minute samples. XRD analysis showed amorphous alumina with the only crystalline peaks belonging to the high cubicity aluminum substrate.

As seen in FIG. 7, the anodization rate calculated was approximately 40 nm/minute for anodization at an applied current of 200 mA/cm$^2$, in 20% H$_2$SO$_4$, at less than 20° C., in the 4 to 10 minute range. This implies that about 12 minutes of anodization are needed at these conditions to reach an amorphous oxide layer thickness of about 500 nm for oxides formed to 485 V.

The XRD data seen in FIG. 8 for the 4 minute sample shows the broad peaks of amorphous alumina. All four sharp crystalline peaks match aluminum metal substrate. Similar XRD results are seen for the 10 minute sample.

Example 3

Heat Treatment and Hydration Effects on Anodized Foil

Samples of aluminum foil are anodized in 20% H$_2$SO$_4$ at less than or about 20° C. and 200 mA/cm$^2$ for 12 minutes to get a porous oxide layer with a thickness of about 500 nm and 6 minutes to get a porous oxide layer with a thickness of about 200 nm, leaving some strength in the foil. A 2 minute-520° C. heat treatment is performed on some samples while a 12 minute hydration step is performed on other samples to test the effects of the heat treatment and the 12 minute hydration on the crystallinity and capacitance after formation of the foil to 450 Volts in citric acid. The rise time (tVn) of the formed foil samples after a 2-hour boil, the capacitance, and the dissipation factor (tan d) were measured for each sample. As seen from the results shown in Table 2, the capacitance obtained for samples that were anodized and hydrated were higher than the capacitance obtained for the sample that was anodized but not hydrated.

TABLE 2

| # | Anodize (min.) | Form (coulomb) | tVn (sec.) | Hydration (min.) | EFV (Volts) | Capacitance (μF/ 10 cm$^2$) | tan d (%) |
|---|---|---|---|---|---|---|---|
| 1 | 12 | 562 | 3 | 0 | 500 | 1.04 | 8 |
| 2 | 6 | 929 | 7 | 12 | 443 | 9.01 | 4.1 |
| 3 | 12 | 372 | 256 | 12 | 451 | 4.86 | 3.6 |

Example 4

Optimization of H$_2$SO$_4$ Anodization

After producing H$_2$SO$_4$ anodized and citrate formed oxide and verifying that the anodized porous oxide is amorphous and the formed foil samples have mixed amorphous/crystalline oxide, optimization of the anodization parameters was conducted. The purpose of the optimization experiment was to achieve maximum capacitance and minimum dissipation factor (tan d) while maintaining good bend strength. Optimization of H$_2$SO$_4$ concentration, anodization temperature and anodization time duration at 50 mA/cm$^2$ was performed. After anodization, the samples were hydrated for 12 minutes at 95° C. and then formed to 485 V using a citric acid formation process. The initial and anodized weights of the foil samples (referred to as "coupons"), the effective formation voltage (EFV), as well as the capacitance of the samples were also measured. Results are shown in Table 3. Two EFV measurements were taken for each sample.

TABLE 3

| Sample | H$_2$SO$_4$ Conc. % | H$_2$SO$_4$ Temp. ° C. (Nominal/Actual) | Time Sec. | Init. Coupon Wt. (g) | Anodized Coupon Wt. (g) | EFV (Volts) | Capacitance (μF/cm$^2$)/ tan d (%) |
|---|---|---|---|---|---|---|---|
| 1 | 5 | 15/18 | 780 | 0.3009 | 0.3070 | —/— | 0.527/3.8 |
| 2 | 5 | 15/18 | 780 | 0.3192 | 0.3246 | 493/489 | 0.523/3.4 |
| 3 | 5 | 45/46 | 780 | 0.3146 | 0.2968 | 499/497 | 0.531/2.9 |
| 4 | 5 | 45/46 | 780 | 0.2965 | 0.2776 | 496/495 | 0.532/3.4 |
| 5 | 15 | 15/18 | 780 | 0.2989 | 0.3009 | 505/501 | 0.507/3.7 |
| 6 | 15 | 15/18 | 780 | 0.3023 | 0.3041 | 501/502 | 0.506/3.7 |
| 7 | 15 | 45/45 | 780 | 0.3095 | 0.2786 | 506/501 | 0.557/4.0 |
| 8 | 15 | 45/45 | 780 | 0.3139 | 0.2817 | 506/501 | 0.552/3.1 |
| 9 | 5 | 30/30 | 600 | 0.3118 | 0.3115 | 507/505 | 0.504/3.1 |
| 10 | 5 | 30/30 | 600 | 0.3158 | 0.3154 | 510/507 | 0.493/3.3 |
| 11 | 5 | 30/31 | 960 | 0.2966 | 0.2944 | 504/499 | 0.517/3.8 |
| 12 | 5 | 30/31 | 960 | 0.2996 | 0.2970 | 505/503 | 0.522/3.8 |
| 13 | 15 | 30/31 | 600 | 0.3021 | 0.2946 | 494/494 | 0.601/3.3 |
| 14 | 15 | 30/31 | 600 | 0.3096 | 0.3030 | 500/498 | 0.588/3.5 |

TABLE 3-continued

| Sample | $H_2SO_4$ Conc. % | $H_2SO_4$ Temp. °C. (Nominal/Actual) | Time Sec. | Init. Coupon Wt. (g) | Anodized Coupon Wt. (g) | EFV (Volts) | Capacitance ($\mu F/cm^2$)/ tan d (%) |
|---|---|---|---|---|---|---|---|
| 15 | 15 | 30/31 | 960 | 0.3155 | 0.3030 | 504/516 | 0.482/3.3 |
| 16 | 15 | 30/31 | 960 | 0.3115 | 0.2992 | 505/507 | 0.476/3.4 |
| 17 | 10 | 15/18 | 600 | 0.2989 | 0.3023 | 503/502 | 0.506/3.6 |
| 18 | 10 | 15/18 | 600 | 0.3171 | 0.3203 | 507/505 | 0.502/3.4 |
| 19 | 10 | 15/17 | 960 | 0.3003 | 0.3049 | —/499 | 0.527/3.9 |
| 20 | 10 | 15/17 | 960 | 0.3039 | 0.3081 | —/501 | 0.526/3.8 |
| 21 | 10 | 45/46 | 600 | 0.3081 | 0.2854 | 507/500 | 0.584/3.0 |
| 22 | 10 | 45/46 | 600 | 0.3170 | 0.2954 | 508/500 | 0.571/3.1 |
| 23 | 10 | 45/46 | 960 | 0.3122 | 0.2732 | 506/501 | 0.538/3.2 |
| 24 | 10 | 45/46 | 960 | 0.3194 | 0.2821 | 506/502 | 0.528/3.1 |
| 25 | 10 | 30/31 | 780 | 0.3270 | 0.3234 | —/510 | 0.490/3.5 |
| 26 | 10 | 30/31 | 780 | 0.3217 | 0.3153 | —/521 | 0.510/3.5 |
| 27 | 10 | 30/31 | 780 | 0.3232 | 0.3179 | 509/509 | 0.510/3.6 |
| 28 | 10 | 30/31 | 780 | 0.3148 | 0.3087 | 517/512 | 0.519/3.6 |
| 29 | 10 | 30/31 | 780 | 0.3112 | 0.3049 | 511/510 | 0.523/3.6 |
| 30 | 10 | 30/31 | 780 | 0.3088 | 0.3021 | 518/512 | 0.522/3.6 |
| 31 | — | — | — | — | — | 499/502 | 0.625/3.7 |
| 32 | — | — | — | — | — | —/506 | 0.624/3.3 |
| 33 | — | — | — | — | — | 505/501 | 0.638/3.5 |
| 34 | — | — | — | — | — | 509/508 | 0.637/3.6 |

The foil samples used were 104 μm high-cubicity etched foils of medium grain. The solutions were anodized in stainless steel lab beakers and had some color at the end of the experiments: 5% colorless, 10% pale blue, and 15% light blue. Samples 1–30 were anodized and formed. Samples 31–34 were formed without anodization. All samples were formed to 485 V, treated with $H_3PO_4$ and annealed. The citrate was changed and made fresh to 250 μS/cm at room temperature (about 500 μS/cm at 90° C.).

Example 5

Optimization of $H_3PO_4$ Anodization

Optimization of $H_3PO_4$ anodization was conducted. Parameters tested include concentrations of $H_3PO_4$ solution, current density applied, and time duration of anodization. The initial and anodized weights of the foil samples were measured. After formation, the rise time (tVn) of the samples after a 2 hour boil in the ramp-build test, the capacitance of the samples, as well as the dissipation factor (tan d) of the samples were also measured. The foil samples were hydrated for 12 minutes at 95° C., formed to 485 V and annealed. Results are shown in Table 4.

TABLE 4

| Sample ID | $H_3PO_4$ M/L | Current Density $mA/cm^2$ | Time Sec. | Init. Wt (g) | Anod. Wt. (g) | EFV (volts) | tVn sec. | Cap. $\mu F/cm^2$ | tan d % |
|---|---|---|---|---|---|---|---|---|---|
| 1 | 0.2 | 10 | 400 | 0.3044 | 0.3023 | 503 | 3 | 0.372 | 3.7 |
| 2 | | | | 0.3127 | 0.3101 | 511 | 4 | 0.534 | 3.5 |
| 3 | 0.2 | 100 | 400 | 0.3126 | 0.3115 | 494 | 500 | 0.434 | 3.9 |
| 4 | | | | 0.3282 | 0.3275 | 494 | 487 | 0.425 | 3.4 |
| 5 | 0.6 | 10 | 400 | 0.3243 | 0.3194 | 495 | 3 | 0.431 | 3.7 |
| 6 | | | | 0.3191 | 0.3145 | 502 | 3 | 0.429 | 3.3 |
| 7 | 0.6 | 100 | 400 | 0.3120 | 0.3054 | 501 | 399 | 0.378 | 3.7 |
| 8 | | | | 0.3078 | 0.3014 | 498 | 479 | 0.391 | 3.7 |
| 9 | 0.2 | 30 | 200 | 0.3215 | 0.3199 | 487 | 123 | 0.458 | 3.8 |
| 10 | | | | 0.3183 | 0.3170 | 483 | 15 | 0.458 | 3.7 |
| 11 | 0.2 | 30 | 600 | 0.3160 | 0.3135 | 500 | 982 | 0.460 | 3.6 |
| 12 | | | | 0.3093 | 0.3069 | 493 | 1140 | 0.463 | 3.7 |
| 13 | 0.6 | 30 | 200 | 0.3055 | 0.3028 | 497 | 488 | 0.478 | 3.7 |
| 14 | | | | 0.3023 | 0.2993 | 497 | 320 | 0.461 | 3.7 |
| 15 | 0.6 | 30 | 600 | 0.3025 | 0.2941 | 497 | 180 | 0.490 | 3.7 |

TABLE 4-continued

| Sample ID | H₃PO₄ M/L | Current Density mA/cm² | Time Sec. | Init. Wt (g) | Anod. Wt. (g) | EFV (volts) | tVn sec. | Cap. µF/cm² | tan d % |
|---|---|---|---|---|---|---|---|---|---|
| 16 | | | | 0.2990 | 0.2909 | 499 | 209 | 0.507 | 3.8 |
| 17 | 0.4 | 10 | 200 | 0.3034 | 0.3013 | 497 | 3 | 0.455 | 4.4 |
| 18 | | | | 0.3061 | 0.3043 | 495 | 3 | 0.451 | 3.8 |
| 19 | 0.4 | 10 | 600 | 0.3151 | 0.3091 | 498 | 3 | 0.511 | 3.8 |
| 20 | | | | 0.3137 | 0.3080 | 498 | 3 | 0.515 | 3.7 |
| 21 | 0.4 | 100 | 200 | 0.3119 | 0.3105 | 501 | 530 | 0.421 | 3.4 |
| 22 | | | | 0.2974 | 0.2961 | 498 | 447 | 0.428 | 3.5 |
| 23 | 0.4 | 100 | 600 | 0.3000 | 0.2913 | 506 | 177 | 0.356 | 3.2 |
| 24 | | | | 0.3099 | 0.3038 | 496 | 881 | 0.393 | 3.2 |
| 25 | 0.4 | 30 | 400 | 0.3036 | 0.3001 | 500 | 24 | 0.368 | 3.4 |
| 26 | | | | 0.3157 | 0.3126 | 501 | 24 | 0.383 | 3.3 |
| 27 | 0.4 | 30 | 400 | 0.3143 | 0.3115 | 496 | 120 | 0.442 | 3.5 |
| 28 | | | | 0.3098 | 0.3069 | 499 | 187 | 0.459 | 3.7 |
| 29 | 0.4 | 30 | 400 | 0.3084 | 0.3053 | 500 | 17 | 0.496 | 3.6 |
| 30 | | | | 0.3022 | 0.2994 | 500 | 3 | 0.485 | 3.5 |
| 31 | 0 | 0 | 0 | 0.2980 | — | 508 | 4 | 0.620 | 3.5 |
| 32 | | | | 0.2954 | | 510 | 4 | 0.619 | 3.5 |
| 33 | 0 | 0 | 0 | 0.3124 | — | 507 | 3 | 0.619 | 3.4 |
| 34 | | | | 0.3181 | | 508 | 3 | 0.601 | 3.4 |

Example 6

Analysis of Thickness and Crystallinity of Anodized Oxides

Sample foils produced by 10% $H_2SO_4$ anodization were analyzed for the nature of the porous oxide structure and thickness and the degree of oxide crystallinity after hydration. Some samples were anodized only while other samples were anodized and hydrated for 12 minutes. One series was anodized for 10 minutes, 16 minutes, and 22 minutes at 15–18° C. while the other was all anodized for 10 minutes at 15° C., 30° C. and 45° C.

It was found that longer anodization times resulted in a thicker layer of oxides, as expected, and that the nature of the porosity changes from being completely porous at the 15–30° C. range to being loosely porous (crumbly in appearance) at 45° C. All hydrated samples appear crystalline.

Example 7

Study of Conversion of Anodized Oxide to Barrier Oxide

Samples of 10 cm² aluminum foil (known as "coupons") were anodized for 16 minutes at 15° C. in 10% $H_2SO_4$ at 0.1 A/cm². The samples were then hydrated and formed to 10, 50, 100, 200, 300, and 485 volts. Two measurements of EFV, tVn, capacitance, tan d, and initial formation coulomb were taken for each sample. Results are shown in Table 5.

TABLE 5

| Sample ID | H₂SO₄ Anod. Con % | Anod. Temp °C. | Anod. Sec. | Hydrat. Min. | Form. Voltage (volts) | EFV (Volts) | tVn Sec. | Capacitance | tan d | Init. Form Coulomb |
|---|---|---|---|---|---|---|---|---|---|---|
| 1 | 10 | 15 | 960 | 12 | 10 | 10.7 | 3 | 40.1 | 109 | 0.03 |
| 2 | | | | | | 10.8 | 2 | 38.0 | 106 | 0.03 |
| 3 | 10 | 15 | 960 | 12 | 50 | 46.9 | 3 | 29.8 | 46.6 | 17.9 |
| 4 | | | | | | 47.9 | 3 | 29.5 | 46.5 | 18.1 |
| 5 | 10 | 15 | 960 | 12 | 100 | 96.2 | 3 | 17.6 | 32.1 | 39.3 |
| 6 | | | | | | 96.4 | 2 | 17.5 | 32.2 | 39.0 |
| 7 | 10 | 15 | 960 | 12 | 200 | 194.8 | 3 | 10.16 | 21.4 | 79.6 |
| 8 | | | | | | 194.5 | 3 | 10.16 | 21.2 | 81.0 |
| 9 | 10 | 15 | 960 | 12 | 300 | 290.3 | 1 | 7.39 | 15.4 | 111.1 |
| 10 | | | | | | 291.8 | 1 | 7.24 | 15.9 | 109.9 |
| 11 | 10 | 15 | 960 | 12 | 485 | 483 | >1800 | 4.074 | 12.0 | 149.4 |
| 12 | | | | | | 483 | >1800 | 4.239 | 11.8 | 151.0 |

Note: All samples are etched foil

Example 8

$H_2SO_4$ Anodizing and Hydrating Optimization

Further optimization of $H_2SO_4$ anodization and hydration of etched foils was conducted. Various combinations of the anodizing time duration, hydration minutes, and $H_3PO_4$ treatment minutes were tested. Results are shown in Table 6.

TABLE 6

| ID | Anod. Min. | Hydr. Min. | H$_3$PO$_4$ Min | Etch Wt. (g) | Anod. Wt. (g) | Form Wt. (g) | EFV Volts | Init. tVn Sec. | Cap. μF/cm$^2$ | Tan d % | Boil tVn Sec. | Form Coulomb |
|---|---|---|---|---|---|---|---|---|---|---|---|---|
| 1 | 8 | 4 | 8 | 0.3235 | 0.3339 | 0.3334 | 490 | 5 | 0.523 | 3.7 | 10.5 | 282 |
| 2 | | | | 0.3161 | 0.3266 | 0.3202 | 488 | 4 | 0.521 | 3.7 | 9.6 | 301 |
| 3 | 8 | 12 | 8 | 0.3117 | 0.3234 | 0.3250 | 506 | 4 | 0.516 | 3.6 | 2.8 | 233 |
| 4 | | | | 0.3259 | 0.3370 | 0.3380 | 501 | 4 | 0.516 | 3.6 | 2.6 | 229 |
| 5 | 12 | 4 | 8 | 0.3289 | 0.3440 | 0.3303 | 499 | 5 | 0.457 | 3.4 | 5.3 | 193 |
| 6 | | | | 0.3193 | 0.3358 | 0.3144 | 502 | 5 | 0.456 | 3.5 | 5.9 | 199 |
| 7 | 12 | 12 | 8 | 0.3148 | 0.3302 | 0.3280 | 505 | 2 | 0.483 | 3.4 | 2.3 | 194 |
| 8 | | | | 0.3103 | 0.3260 | 0.3140 | 505 | 2 | 0.478 | 3.3 | 2.7 | 191 |
| 9 | 8 | 8 | 4 | 0.3270 | 0.3395 | 0.3478 | 512 | 6 | 0.502 | 3.6 | 3.7 | 260 |
| 10 | | | | 0.3266 | 0.3386 | 0.3397 | 510 | 6 | 0.497 | 3.6 | 3.4 | 255 |
| 11 | 8 | 8 | 12 | 0.3237 | 0.3345 | 0.3425 | 482 | 3 | 0.511 | 4.0 | 3.2 | 326 |
| 12 | | | | 0.3167 | 0.3276 | 0.3280 | 482 | 2 | 0.511 | 4.0 | 3.4 | 328 |
| 13 | 12 | 8 | 4 | 0.3142 | 0.3295 | 0.3339 | 503 | 8 | 0.470 | 3.4 | 5.7 | 201 |
| 14 | | | | 0.3085 | 0.3240 | 0.3189 | 503 | 7 | 0.470 | 3.9 | 4.5 | 201 |
| 15 | 12 | 8 | 12 | 0.3259 | 0.3421 | 0.3327 | 493 | 3 | 0.490 | 3.3 | 4.4 | 189 |
| 16 | | | | 0.3199 | 0.3369 | 0.3161 | 495 | 3 | 0.486 | 3.5 | 3.7 | 189 |
| 17 | 10 | 4 | 4 | 0.3034 | 0.3162 | 0.3094 | 489 | 12 | 0.461 | 3.6 | 10.5 | 270 |
| 18 | | | | 0.3038 | 0.3175 | 0.3036 | 491 | 17 | 0.468 | 3.7 | 5.9 | 256 |
| 19 | 10 | 4 | 12 | 0.3068 | 0.3197 | 0.3131 | 481 | 2 | 0.496 | 3.7 | 9.6 | 237 |
| 20 | | | | 0.3110 | 0.3239 | 0.3093 | 482 | 2 | 0.486 | 3.5 | 6.9 | 284 |
| 21 | 10 | 12 | 4 | 0.3168 | 0.3304 | 0.3399 | 500 | 6 | 0.493 | 3.3 | 2.6 | 208 |
| 22 | | | | 0.3205 | 0.3335 | 0.3330 | 499 | 5 | 0.483 | 3.3 | 2.8 | 202 |
| 23 | 10 | 12 | 12 | 0.3216 | 0.3356 | 0.3355 | 488 | 3 | 0.498 | 3.4 | 3.2 | 191 |
| 24 | | | | 0.3183 | 0.3328 | 0.3314 | 492 | 2 | 0.489 | 3.3 | 2.7 | 188 |
| 25 | 10 | 8 | 8 | 0.3139 | 0.3280 | 0.3279 | 489 | 3 | 0.491 | 3.3 | 2.7 | 209 |
| 26 | | | | 0.3177 | 0.3322 | 0.3219 | 492 | 3 | 0.480 | 3.5 | 2.6 | 205 |
| 27 | 10 | 8 | 8 | 0.3070 | 0.3200 | 0.3203 | 486 | 3 | 0.499 | 3.5 | 3.7 | 225 |
| 28 | | | | 0.3044 | 0.3177 | 0.3068 | 490 | 3 | 0.487 | 3.4 | 3.0 | 218 |
| 29 | 10 | 8 | 8 | 0.3019 | 0.3147 | 0.3166 | 487 | 3 | 0.496 | 3.6 | 3.2 | 354 |
| 30 | | | | 0.3025 | 0.3150 | 0.3060 | 488 | 3 | 0.480 | 3.6 | 3.3 | 346 |
| 31 | 0 | 12 | 4 | 0.3016 | — | 0.3466 | 485 | 4 | 0.628 | 4.1 | 24.2 | 342 |
| 32 | | | | 0.3018 | — | 0.3393 | 487 | 4 | 0.648 | 4.0 | 25.6 | 359 |
| 33 | 0 | 12 | 12 | 0.3044 | — | 0.3492 | 482 | 3 | 0.660 | 4.0 | 18.0 | 354 |
| 34 | | | | 0.3091 | — | 0.3437 | 481 | 3 | 0.650 | 4.0 | 17.2 | 346 |

Example 9

Analysis of Sample Results

FIGS. 9 and 10 are graphs of sample results obtained from experiments and show the effect of anodizing the foil before the standard hydration and formation steps. Although FE-SEM photos have revealed that the anodized layers are not optimum for strength and punch yield, anodizing times of approximately 800 seconds at 15° C. to 25° C. at approximately 10% H$_2$SO$_4$ concentration gives tVn (rise times) of about 1 to 3 seconds after a 2 hour boil in the boiling water ramp-build-time test versus 15–30 seconds for a control foil formed without anodizing.

Example 10

Anodization, Hydration, and H$_3$PO$_4$ Treatment Time Optimization

Optimization was performed on the combination of anodizing, hydrating, and H$_3$PO$_4$ treatment time durations. High-gain, etched foil samples which underwent 40 coulombs/cm$^2$ widening were anodized for various time durations at 200 mA/cm$^2$, in a solution of 10% H$_2$SO$_4$ which was held at 15–20° C. The samples were then hydrated for various amounts of time at 95° C. and formed. The formed samples were then treated with H$_3$PO$_4$ for various time durations. The capacitance, rise times, and tan d values for each sample were measured. Results are shown in Table 7 below.

TABLE 7

| ID | Anod. Min. | Hydr. Min. | H$_3$PO$_4$ Min. | Etch Wt. (g) | Anod. Wt. (g) | Form Wt. (g) | Form (coulombs) | EFV (volts) | Init. tV$_N$ Sec. | Cap. μF/cm$^2$ | Tan d | Boil tV$_N$ Sec. | BPO PS |
|---|---|---|---|---|---|---|---|---|---|---|---|---|---|
| 1 | 6 | 6 | 9 | 0.4394 | 0.4417 | 0.4413 | 568 | 473 | 2 | 0.891 | 3.6 | 5.6 | 20 |
|  |  |  |  | 0.4307 | 0.4390 | 0.4424 | 568 | 472 | 3 | 0.882 | 3.7 | 7.3 | 25 |
| 2 | 6 | 10 | 9 | 0.4307 | 0.4471 | 0.4533 | 404 | 472 | 30 | 0.918 | 3.3 | 22.3 | 23 |
|  |  |  |  | 0.4369 | 0.4447 | 0.4544 | 428 | 470 | 22 | 0.919 | 3.5 | 26.4 | <20 |
| 3 | 8 | 6 | 9 | 0.4378 | 0.4736 | 0.4585 | 445 | 476 | 5 | 0.840 | 3.4 | 11.7 | 25 |
|  |  |  |  | 0.4303 | 0.4724 | 0.4557 | 456 | 471 | 9 | 0.801 | 3.3 | 3 | 50 |

TABLE 7-continued

| ID | Anod. Min. | Hydr. Min. | H₃PO₄ Min. | Etch Wt. (g) | Anod. Wt. (g) | Form Wt. (g) | Form (coulombs) | EFV (volts) | Init. tV$_N$ Sec. | Cap. μF/cm² | Tan d | Boil tV$_N$ Sec. | BPO PS |
|---|---|---|---|---|---|---|---|---|---|---|---|---|---|
| 4 | 8 | 10 | 9 | 0.4280 | 0.4559 | 0.4479 | 324 | 478 | 13 | 0.838 | 3.2 | 11.1 | 27 |
|   |   |   |   | 0.4268 | 0.4659 | 0.4400 | 369 | 488 | 10 | 0.889 | 3.3 | 6.6 | 23 |
| 5 | 6 | 8 | 6 | 0.4519 | 0.4708 | 0.4741 | 425 | 478 | 6 | 0.887 | 3.4 | 25.4 | 20 |
|   |   |   |   | 0.4380 | 0.4583 | 0.4682 | 493 | 477 | 6 | 0.895 | 3.3 | 19.1 | <20 |
| 6 | 6 | 8 | 12 | 0.4307 | 0.4500 | 0.4521 | 425 | 465 | 4 | 0.915 | 3.7 | 18.9 | <20 |
|   |   |   |   | 0.4267 | 0.4478 | 0.4518 | 463 | 465 | 4 | 0.918 | 3.5 | 23.5 | <20 |
| 7 | 8 | 8 | 6 | 0.4302 | 0.4561 | 0.4553 | 378 | 474 | 18 | 0.822 | 3.2 | 12.8 | 25 |
|   |   |   |   | 0.4261 | 0.4542 | 0.4497 | 394 | 478 | 15 | 0.818 | 3.4 | 16.8 | 27 |
| 8 | 8 | 8 | 12 | 0.4397 | 0.4657 | 0.4501 | 456 | 475 | 4 | 0.853 | 3.4 | 7.2 | 45 |
|   |   |   |   | 0.4487 | 0.4966 | 0.4598 | 420 | 467 | 4 | 0.851 | 3.6 | 10.5 | 34 |
| 9 | 7 | 6 | 6 | 0.4291 | 0.4533 | 0.4484 | 429 | 477 | 12 | 0.847 | 3.5 | 27.1 | 50 |
|   |   |   |   | 0.4280 | 0.4S36 | 0.4484 | 481 | 478 | 16 | 0.814 | 3.3 | 41.8 | 45 |
| 10 | 7 | 6 | 12 | 0.4496 | 0.4712 | 0.4621 | 412 | 474 | 5 | 0.894 | 3.7 | 13.8 | 50 |
|   |   |   |   | 0.4579 | 0.4617 | 0.4531 | 464 | 475 | 6 | 0.889 | 3.6 | 16.1 | <20 |
| 11 | 7 | 10 | 6 | 0.4306 | 0.4533 | 0.4545 | 370 | 479 | 15 | 0.896 | 3.2 | 24.0 | 20 |
|   |   |   |   | 0.4492 | 0.4739 | 0.4961 | 370 | 486 | 23 | 0.890 | 3.3 | 17.3 | 23 |
| 12 | 7 | 10 | 12 | 0.4383 | 0.4620 | 0.4388 | 390 | 477 | 4 | 0.903 | 3.3 | 7.6 | <20 |
|   |   |   |   | 0.4460 | 0.4695 | 0.4647 | 365 | 476 | 4 | 0.915 | 3.6 | 9.8 | 20 |
| 13 | 7 | 8 | 9 | 0.4501 | 0.4741 | 0.4716 | 384 | 484 | 6 | 0.882 | 3.4 | 13.5 | 22 |
|   |   |   |   | 0.4482 | 0.4741 | 0.4703 | 400 | 485 | 5 | 0.871 | 3.6 | 11.5 | 23 |
| 14 | 7 | 8 | 9 | 0.4294 | 0.4524 | 0.4505 | 415 | 473 | 3 | 0.869 | 3.4 | 9.7 | 45 |
|   |   |   |   | 0.4258 | 0.4505 | 0.4522 | 437 | 472 | 3 | 0.837 | 3.5 | 7.5 | 22 |
| 15 | 7 | 8 | 9 | 0.4470 | 0.4710 | 0.4689 | 401 | 476 | 5 | 0.860 | 3.6 | 11.8 | 22 |
|   |   |   |   | 0.4503 | 0.4953 | 0.4266 | 460 | 477 | 4 | 0.428 | 4.9 | 3.2 | 35 |
| 16 | 0 | 12 | 12 | 0.4495 | — | 0.4965 | 433 | 473 | 8 | 0.618 | 4.8 | 31.1 | <20 |
|   |   |   |   | 0.4521 | — | 0.5012 | 424 | 472 | 8 | 0.633 | 4.8 | 34.3 | <20 |
| 17 | 0 | 12 | 12 | 0.4377 | — | 0.4853 | 450 | 475 | 8 | 0.608 | 4.7 | 35.5 | <20 |
|   |   |   |   | 0.4477 | — | 0.4999 | 430 | 474 | 7 | 0.629 | 4.6 | 41.2 | <20 |

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents. Additionally, all patents, patent applications and publications mentioned above are incorporated by reference herein.

What is claimed is:

1. A method of producing an anodic foil for use in a capacitor, comprising the steps of:
   (a) anodizing the foil by dipping the foil in an anodizing composition and applying a current to form a nano-porous amorphous oxide layer on said foil;
   (b) hydrating the foil, wherein step (a) is performed prior to step (b); and
   (c) forming a barrier oxide layer on said foil, wherein steps (a) and (b) are performed prior to step (c).

2. The method of claim 1, wherein said anodizing composition comprises an aqueous solution of an oxidizing acid, said oxidizing acid selected from the group consisting of sulfuric acid, oxalic acid, phosphoric acid, and tartaric acid.

3. The method of claim 2, wherein said anodizing composition is an aqueous solution of sulfuric acid.

4. The method of claim 2, wherein said anodizing composition comprises from about 1% to about 50% by weight of said oxidizing acid.

5. The method of claim 4, wherein said anodizing composition comprises from about 5% to about 20% by weight of said oxidizing acid.

6. The method of claim 5, wherein said anodizing composition comprises from about 10% to about 20% by weight of said oxidizing acid.

7. The method of claim 6, wherein said anodizing composition comprises about 10% by weight of said oxidizing acid.

8. The method of claim 1, wherein said current is about 200 mA/cm².

9. The method of claim 8, wherein said anodizing step is carried out for a time duration of about 5 minutes to about 10 minutes.

10. The method of claim 9, wherein said anodizing step is carried out for a time duration of about 6 minutes to about 7 minutes.

11. The method of claim 1, wherein said anodizing step is carried out at a temperature of about −25° C. to about 45° C.

12. The method of claim 11, wherein said anodizing step is carried out at a temperature of about 15° C. to about 25° C.

13. The method of claim 1, wherein said nano-porous amorphous oxide layer has a thickness of about 300 nm to about 700 nm.

14. The method of claim 13, wherein said nano-porous amorphous oxide layer has a thickness of about 350 nm to about 500 nm.

15. The method of claim 14, wherein said nano-porous amorphous oxide layer has a thickness of about 500 nm.

16. The method of claim 1, wherein said hydrating step comprises dipping said foil in a bath of deionized water at a temperature of about 85° C. to about 100° C.

17. The method of claim 16, wherein said hydrating step comprises dipping said foil in a bath of deionized water at a temperature of about 95° C.

18. The method of claim 17, wherein said hydrating step is carried out for a time duration of about 6 minutes to about 12 minutes.

19. The method of claim 1, wherein said hydrating step is carried out for a time duration of about 1 minute to about 3 hours.

20. The method of claim 1, wherein after step (a) and prior to step (b), said foil is rinsed in an overflow bath of deionized water.

21. The method of claim 1, wherein step (c) comprises placing said foil in a first forming composition at a first applied voltage.

22. The method of claim 21, wherein said forming composition comprises an aqueous solution of low concentration citric acids.

23. The method of claim 21, wherein said forming composition comprises an aqueous solution of low concentration carboxylic acids.

24. The method of claim 21, wherein said applied voltage is about 400 Volts to about 500 Volts.

25. The method of claim 24, wherein said applied voltage is about 430 Volts to about 485 Volts.

26. The method of claim 21, wherein said forming step is carried out at a temperature of about 85° C. to about 100° C.

27. The method of claim 26, wherein said forming step is carried out at a temperature of about 85° C.

28. The method of claim 21, wherein step (c) further comprises heat treating said foil.

29. The method of claim 28, wherein said heat treating step is carried out at a temperature of about 350° C. to about 550° C. for a time duration of about 1 minute to about 10 minutes.

30. The method of claim 28, wherein step (c) further comprises reforming said barrier oxide layer on said foil.

31. The method of claim 30, wherein said reforming step comprises dipping said foil in a second forming composition at a second applied voltage.

32. The method of claim 30, wherein prior to said reforming step, said foil is rinsed in an overflow bath of deionized water.

33. The method of claim 21, wherein step (c) further comprises dipping said foil in an aqueous solution of phosphoric acid.

34. The method of claim 33, wherein said foil is dipped in an aqueous solution comprising about 1% to about 10% by weight of phosphoric acid for a time duration of about 4 minutes to about 12 minutes at a temperature of about 50° C. to about 70° C.

35. The method of claim 33, wherein step (c) further comprises reforming said barrier oxide layer on said foil.

36. The method of claim 35, wherein said reforming step comprises dipping said foil in a second forming composition at a second applied voltage.

37. The method of claim 35, wherein prior to said reforming step, said foil is rinsed in an overflow bath of deionized water.

38. An anodic foil produced by the method of claim 1.

39. The anodic foil of claim 38, wherein the oxide layer formed on said anodic foil has a rise time of less than 15 seconds after 2 hours of exposure to boiling water.

40. The anodic foil of claim 39, wherein the oxide layer formed on said anodic foil has a rise time of about 1 second to about 3 seconds after 2 hours of exposure to boiling water.

41. An electrolytic capacitor comprising an anodic foil produced by the method of claim 1.

42. An implantable cardioverter defibrillator comprising an electrolytic capacitor having an anodic foil produced by the method of claim 1.

43. A method of producing an anodic foil for use in a capacitor, comprising the steps of:
(a) anodizing said foil by placing said foil in an aqueous solution of an oxidizing acid at a temperature of about 15° C. to about 25° C. and applying a current;
(b) hydrating said foil in a bath of deionized water at a temperature of about 80° C. to about 100° C.;
(c) forming a barrier oxide layer on said foil by placing said foil in a first forming composition and applying a first voltage to said foil;
(d) heat treating said foil;
(e) reforming said barrier oxide layer on said foil by placing said foil in a second forming composition and applying a second voltage to said foil; and
(f) dipping said foil in an aqueous solution of phosphoric acid.

44. The method of claim 43, further comprising annealing said foil, wherein said annealing comprises heat treating said foil at a temperature of about 250° C. to about 350° C. for a time duration of about 1 minute to about 5 minutes.

45. An anodic foil produced by the method of claim 43.

46. The anodic foil of claim 45, wherein the oxide layer formed on said anodic foil has a rise time of less than 15 seconds after 2 hours of exposure to boiling water.

47. The anodic foil of claim 46, wherein the oxide layer formed on said anodic foil has a rise time of about 1 second to about 3 seconds after 2 hours of exposure to boiling water.

48. An electrolytic capacitor comprising an anodic foil produced by the method of claim 43.

49. An implantable cardioverter defibrillator comprising an electrolytic capacitor having an anodic foil produced by the method of claim 43.

50. A method of producing an anodic foil for use in a capacitor, comprising the steps of:
(a) anodizing the foil to produce a nano-porous amorphous oxide layer; and
(b) hydrating the foil to convert said nano-porous amorphous oxide layer to a crystalline precursor layer.

* * * * *